US012573161B2

(12) United States Patent
Sun et al.

(10) Patent No.:  US 12,573,161 B2
(45) Date of Patent:       Mar. 10, 2026

(54) LEARNING ARTICULATED SHAPE RECONSTRUCTION FROM IMAGERY

(71) Applicant: Google LLC, Mountain View, CA (US)

(72) Inventors: Deqing Sun, Cambridge, MA (US);
Varun Jampani, Rockland, MA (US);
Gengshan Yang, Pittsburgh, PA (US);
Daniel Vlasic, Cambridge, MA (US);
Huiwen Chang, Jersey City, NJ (US);
Forrester H. Cole, Cambridge, MA (US); Ce Liu, Cambridge, MA (US);
William Tafel Freeman, Acton, MA (US)

(73) Assignee: GOOGLE LLC, Mountain View, CA (US)

( * ) Notice: Subject to any disclaimer, the term of this patent is extended or adjusted under 35 U.S.C. 154(b) by 344 days.

(21) Appl. No.: 18/252,118

(22) PCT Filed: Dec. 21, 2020

(86) PCT No.: PCT/US2020/066305
§ 371 (c)(1),
(2) Date: May 8, 2023

(87) PCT Pub. No.: WO2022/139784
PCT Pub. Date: Jun. 30, 2022

(65) Prior Publication Data
US 2024/0013497 A1      Jan. 11, 2024

(51) Int. Cl.
*G06T 7/40*       (2017.01)
*G06T 7/20*       (2017.01)
(Continued)

(52) U.S. Cl.
CPC ................ *G06T 19/20* (2013.01); *G06T 7/20* (2013.01); *G06T 7/40* (2013.01); *G06T 7/55* (2017.01);
(Continued)

(58) Field of Classification Search
None
See application file for complete search history.

(56) References Cited

U.S. PATENT DOCUMENTS

2013/0285908 A1 * 10/2013  Kaplan ................... G06F 3/017
                                                                345/158
2016/0223475 A1 *  8/2016  Palamodov ........... G06T 11/005
(Continued)

FOREIGN PATENT DOCUMENTS

CN            111563967          8/2020

OTHER PUBLICATIONS

Yu et al., "Direct, dense, and deformable: Template-based non-rigid 3d reconstruction from rgb video," Proceedings of the IEEE international conference on computer vision (Year: 2015).*
(Continued)

*Primary Examiner* — Anh-Tuan V Nguyen
(74) *Attorney, Agent, or Firm* — DORITY & MANNING P.A.

(57)                ABSTRACT
A computing system and method can be used to render a 3D shape from one or more images. In particular, the present disclosure provides a general pipeline for learning articulated shape reconstruction from images (LASR). The pipeline can reconstruct rigid or nonrigid 3D shapes. In particular, the pipeline can automatically decompose non-rigidly deforming shapes into rigid motions near rigid-bones. This pipeline incorporates an analysis-by-synthesis strategy and forward-renders silhouette, optical flow, and color images which can be compared against the video observations to
(Continued)

adjust the internal parameters of the model. By inverting a rendering pipeline and incorporating optical flow, the pipeline can recover a mesh of a 3D model from the one or more images input by a user.

20 Claims, 13 Drawing Sheets

(51) Int. Cl.

| | |
|---|---|
| *G06T 7/55* | (2017.01) |
| *G06T 17/20* | (2006.01) |
| *G06T 19/20* | (2011.01) |

(52) U.S. Cl.
CPC .... *G06T 17/20* (2013.01); *G06T 2207/10016* (2013.01); *G06T 2207/20081* (2013.01); *G06T 2207/20084* (2013.01); *G06T 2207/30244* (2013.01); *G06T 2219/2021* (2013.01)

(56) References Cited

U.S. PATENT DOCUMENTS

| | | | | |
|---|---|---|---|---|
| 2020/0265294 | A1* | 8/2020 | Kim | G06T 13/40 |
| 2021/0012558 | A1* | 1/2021 | Li | G06T 17/00 |
| 2021/0125583 | A1* | 4/2021 | Kaplanyan | G06N 3/088 |
| 2021/0150287 | A1* | 5/2021 | Baek | G06F 18/2415 |
| 2021/0158028 | A1* | 5/2021 | Wu | G06V 10/774 |
| 2021/0241522 | A1* | 8/2021 | Guler | G06T 19/20 |
| 2021/0256251 | A1* | 8/2021 | Lin | G06N 3/04 |
| 2022/0067940 | A1* | 3/2022 | Heng | G06T 7/10 |
| 2022/0245911 | A1* | 8/2022 | Hu | G06N 3/0499 |
| 2022/0270402 | A1 | 8/2022 | Cole et al. | |
| 2022/0358770 | A1* | 11/2022 | Guler | G06T 7/50 |
| 2023/0070008 | A1* | 3/2023 | Kulon | G06T 17/20 |

OTHER PUBLICATIONS

Alldieck et al., "Learning to Reconstruct People in Clothing from a Single RGB Camera", IEEE Conference on Computer Vision and Pattern Recognition, Jun. 15, 2019, XP033687140, pp. 1175-1186.

Henderson et al., "Learning to Generate and Reconstruct 3D Meshes with Only 2D Supervision", arxiv.org, Jul. 24, 2018, XP081426760, 14 pages.
International Search Report for Application No. PCt/US2020/066305, mailed on Sep. 15, 2021, 2 pages.
Kato et al., "Differentiable Rendering: A Survey", arxiv.org, Jul. 31, 2020, XP081726202, 20 pages.
Li et al., "Online Adaptation for Consistent Mesh Reconstruction in the Wild" arxiv.org, Dec. 6, 2020, XP081831342, 22 pages.
Zuffi et al., "Three-D Safar: Learning to Estimate Zebra Pose, Shape, and Texture from Images 'In the Wild'", 2019 IEEE International Conference on Computer Vision, Oct. 27, 2019, pp. 5358-5367, XP033724041.
Chen et al., "Deep Non-Rigid Structure from Motion.", arXiv:1908.00052v2, Aug. 11, 2019, 10 pages.
Gotardo et al., "Non-Rigid Structure from Motion with Complementary Rank-3 Spaces.", Twenty-fourth Institute of Electrical and Electronics Engineers Conference on Computer Vision and Pattern Recognition, Colorado Springs, Colorado, United States, Jun. 20-25, 2011, pp. 3065-3072.
Kanazawa et al., "Learning Category-Specific Mesh Reconstruction from Image Collections.", arXiv:1803.07549v2, Jul. 30, 2018, 21 pages.
Loper et al., "SMPL: A Skinned Multi-Person Linear Model.", Association for Computing Machinery Transactions on Graphics, vol. 34, No. 6, Article No. 248, Oct. 26, 2015, pp. 1-16.
Tomasi et al., "Shape and Motion from Image Streams Under Orthography: A Factorization Method.", International Journal of Computer Vision, vol. 9, No. 2, pp. 137-154.
Yang et al., "LASR: Learning Articulated Shape Reconstruction from a Monocular Video.", arXiv:2105.02976v1, May 6, 2021, 12 pages.
Zuffi et al., "Lions and Tigers and Bears: Capturing Non-Rigid, 3D, Articulated Shape from Images.", 2018 Institute of Electrical and Electronics Engineers Conference on Computer Vision and Pattern Recognition, Salt Lake City, Utah, United States, 2018, pp. 3955-3963.
International Preliminary Report on Patentability for Application No. PCT/US2020/066305, mailed Jun. 29, 2023, 11 pages.
Machine Translated Chinese Search Report Corresponding to Application No. 2020801023682 on Aug. 28, 2024.

* cited by examiner

1400

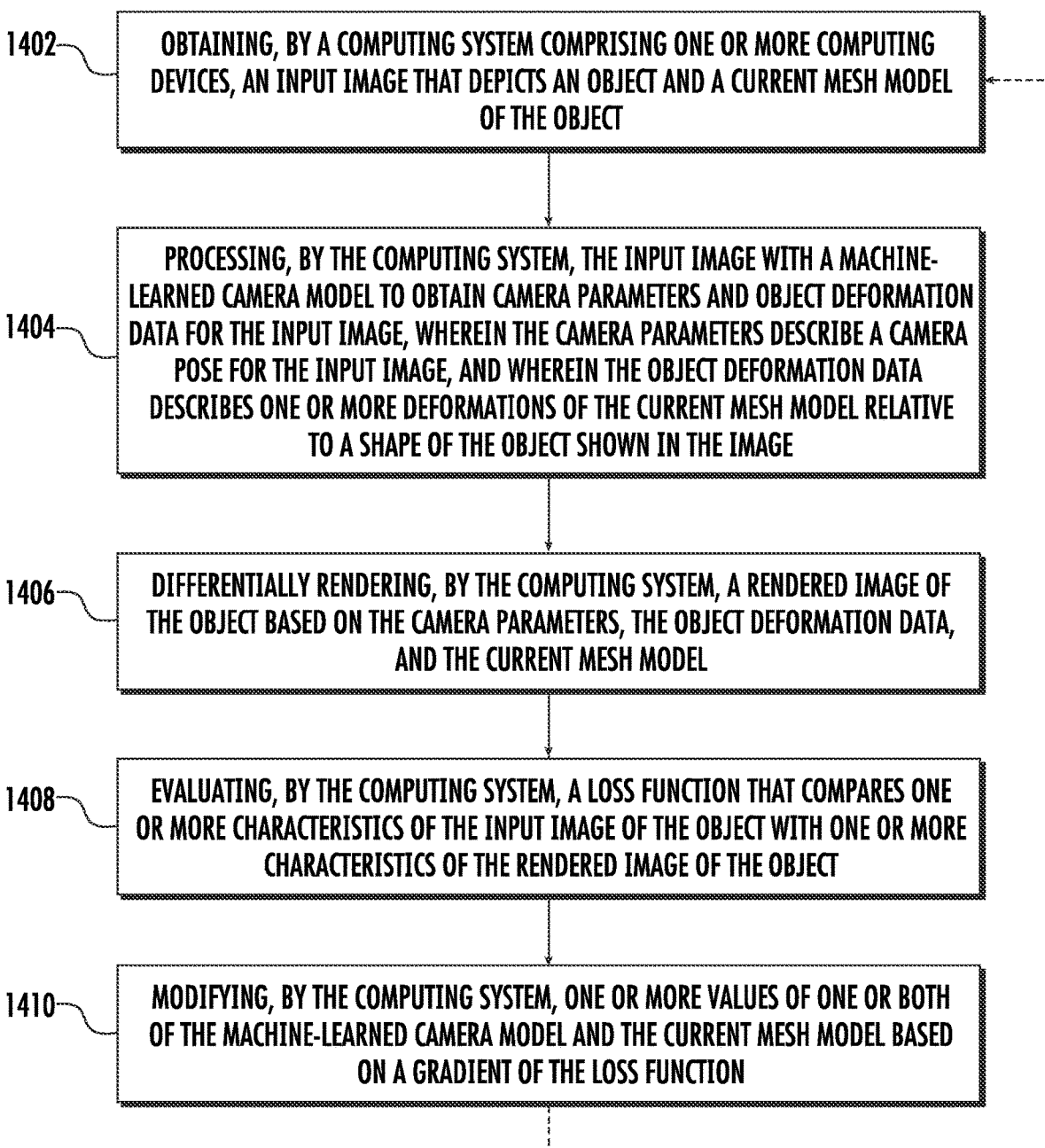

1402 — OBTAINING, BY A COMPUTING SYSTEM COMPRISING ONE OR MORE COMPUTING DEVICES, AN INPUT IMAGE THAT DEPICTS AN OBJECT AND A CURRENT MESH MODEL OF THE OBJECT

1404 — PROCESSING, BY THE COMPUTING SYSTEM, THE INPUT IMAGE WITH A MACHINE-LEARNED CAMERA MODEL TO OBTAIN CAMERA PARAMETERS AND OBJECT DEFORMATION DATA FOR THE INPUT IMAGE, WHEREIN THE CAMERA PARAMETERS DESCRIBE A CAMERA POSE FOR THE INPUT IMAGE, AND WHEREIN THE OBJECT DEFORMATION DATA DESCRIBES ONE OR MORE DEFORMATIONS OF THE CURRENT MESH MODEL RELATIVE TO A SHAPE OF THE OBJECT SHOWN IN THE IMAGE

1406 — DIFFERENTIALLY RENDERING, BY THE COMPUTING SYSTEM, A RENDERED IMAGE OF THE OBJECT BASED ON THE CAMERA PARAMETERS, THE OBJECT DEFORMATION DATA, AND THE CURRENT MESH MODEL

1408 — EVALUATING, BY THE COMPUTING SYSTEM, A LOSS FUNCTION THAT COMPARES ONE OR MORE CHARACTERISTICS OF THE INPUT IMAGE OF THE OBJECT WITH ONE OR MORE CHARACTERISTICS OF THE RENDERED IMAGE OF THE OBJECT

1410 — MODIFYING, BY THE COMPUTING SYSTEM, ONE OR MORE VALUES OF ONE OR BOTH OF THE MACHINE-LEARNED CAMERA MODEL AND THE CURRENT MESH MODEL BASED ON A GRADIENT OF THE LOSS FUNCTION

FIG. 11

LEARNING ARTICULATED SHAPE RECONSTRUCTION FROM IMAGERY

PRIORITY CLAIM

This application is based upon and claims the right of priority under 35 U.S.C. § 371 to International Application No. PCT/US2020/066305 filed on Dec. 21, 2020, which is incorporated by reference herein.

FIELD

The present disclosure relates generally to three-dimensional ("3D") reconstruction. More particularly, the present disclosure relates to systems and methods which reconstruct models of objects (e.g., nonrigid objects) from imagery (e.g., RGB input image(s)).

BACKGROUND

Modeling of 3D entities is a process of developing a mathematical representation of an object (e.g., the surface of the object) in three dimensions. Modeling dynamics of 3D entities can involve using data descriptive of an object to construct a 3D mesh shape of the object that can be deformed into various poses.

Some standard 3D modeling methods rely on 3D supervision, such as synthetic renderings and depth scans. However, depth data is generally difficult to acquire and even more difficult to scale-up due to current sensor designs. Other standard 3D modeling methods rely on inferring 3D shape from point trajectories of a plurality of static images. These standard models are able to achieve high accuracy on benchmarks with rich training labels, however, they fail to generalize in the low-data regimes. Moreover, such approaches often hallucinate inaccurate 3D structure when image observations are impoverished.

While progress has been made in the field without relying on strong shape priors by taking advantage of multi-view data recordings, such results are limited to static scenes.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for determining 3D object shape from imagery. The method comprises a computing system obtaining one or more computing devices, an input image that depicts an object and a current mesh model of the object. The method comprises a computing system processing the input image with a camera model to obtain camera parameters and object deformation data for the input image. The camera parameters describe a camera pose for the input image. The object deformation data describes one or more deformations of the current mesh model relative to a shape of the object shown in the input image. The method comprises a computing system differentiably rendering a rendered image of the object based on the camera parameters, the object deformation data, and the current mesh model. The method comprises a computing system evaluating a loss function that compares one or more characteristics of the input image of the object with one or more characteristics of the rendered image of the object. The method comprises a computing system modifying one or more values of one or both of the camera model and the current mesh model based on a gradient of the loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 11 depicts a flow chart diagram of an example method to perform LASR according to example embodiments of the present disclosure.

Figure 1A:
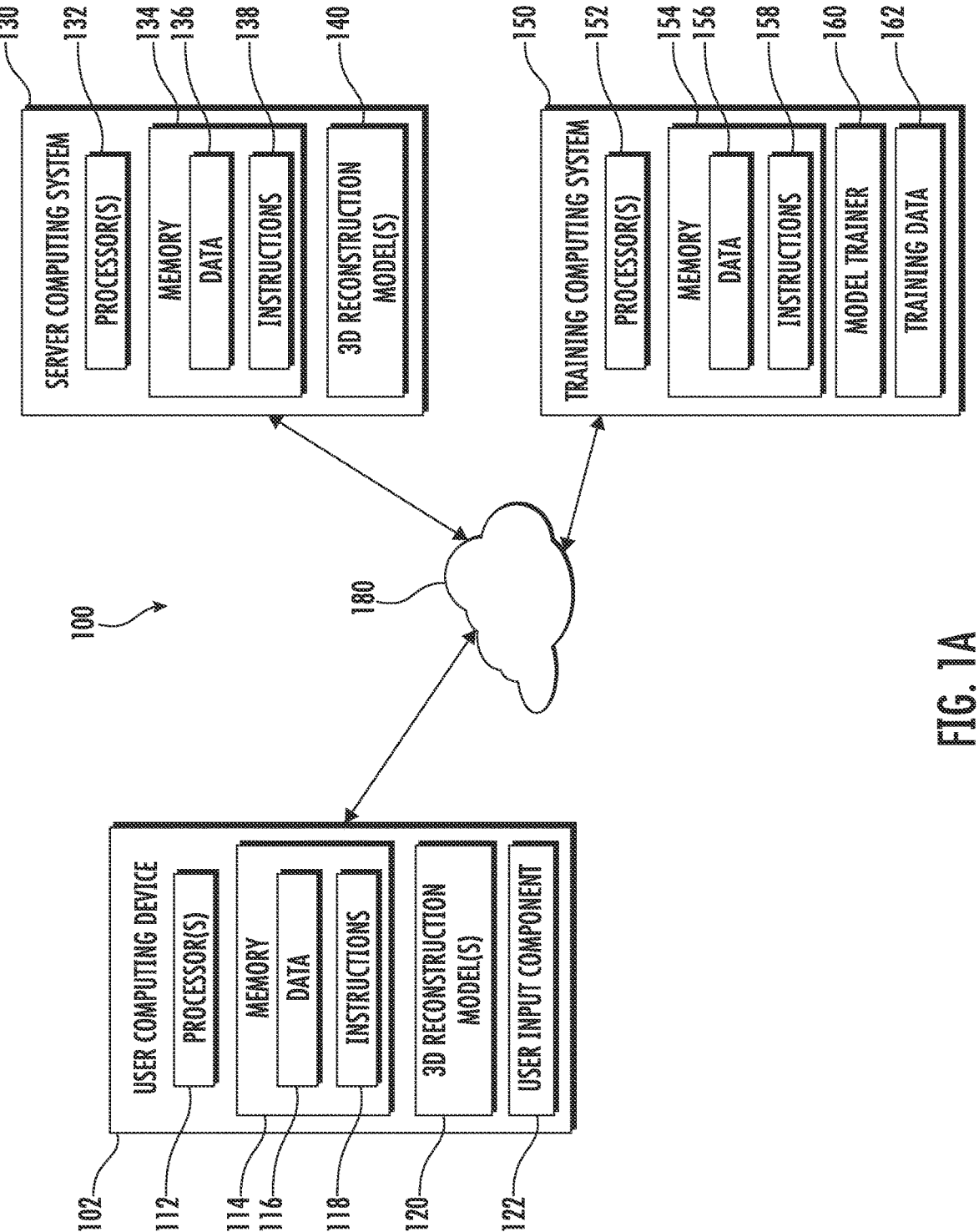
FIG. 1A depicts a block diagram of an example computing system that performs learning articulated shape reconstruction (LASR) according to example embodiments of the present disclosure.

Reference numerals that are repeated across plural figures are intended to identify the same features in various implementations.

DETAILED DESCRIPTION

Overview

Generally, the present disclosure is directed to a computing system and method that can be used to reconstruct a 3D shape of an object from images of the object such as, for example, a monocular video of the object. In particular, the present disclosure provides a general pipeline for learning articulated shape reconstruction (which can be referred to as LASR) from one or more images. The pipeline can reconstruct models of rigid or nonrigid 3D shapes. In particular, an example pipeline described herein can automatically decompose non-rigidly deforming shapes into rigid motions near rigid-bones. This pipeline incorporates an analysis-by-synthesis strategy and forward-renders silhouette, optical flow, and color images which can be compared against the video observations to adjust the internal parameters of the model. By inverting a rendering pipeline and incorporating image analysis techniques such as optical flow, the pipeline can recover a mesh of a 3D model from the one or more images input by a user.

More particularly, an example 3D modeling pipeline can perform an analysis-by-synthesis task in which a machine-learned mesh model for an object can be learned jointly with a machine-learned camera model by minimizing a loss function that evaluates a difference between one or more input images of the object and one or more rendered images of the object. Furthermore, a library of shape models can be built from a single set of one or more images of an object. The pipeline can solve the inverse graphics problem of recovering the 3D object shape (e.g., spacetime deformation) and camera trajectories (e.g., intrinsics) so as to fit video or image frame observations, such as silhouette, raw pixels, and optical flow. As a further example, the library of shape models can be built by performing the pipeline on multiple images that depict multiple objects.

Example methods for a model-free approach for 3D shape learning from one or more images can include obtaining an input image that depicts an object and a current mesh model of the object. In particular, the ground truth may be included in a set of one or more images. As an example, the ground truth can be one or more monocular sequence(s) such as a video captured by a monocular camera. As a further example, the monocular sequence(s) can have segmentation of a foreground object.

The input image can be processed with a machine-learned camera model. The machine-learned camera model can predict information about the ground truth data. Specifically, the information can include camera parameters and/or object deformation data. The camera parameters can describe a camera pose for the input image (e.g., relative to a reference location and/or pose). The object deformation data can describe one or more deformations of a current mesh model. For instance, the deformations of the current mesh model can be relative changes between the current mesh model and a shape of the object shown in the image.

A rendered image of the object can be differentiably rendered (e.g., using a differentiable rendering technique). The rendered image can be based on the camera parameters, object deformation data, and current mesh model. The rendered image can depict the current mesh model deformed according to the object deformation data and from the camera pose described by the camera parameters.

A loss function can be evaluated that compares one or more characteristics of the input image of the object with one or more characteristics of the rendered image of the object. One or more values of one or both of the machine-learned camera model and the current mesh model can be modified based on the loss function. For example, modifying one or both of the machine-learned camera model and the current mesh model can be based at least in part on gradient signals wherein the gradient signals describe a gradient of the loss function relative to parameter(s) of the model(s).

In some implementations, evaluating a loss function can include evaluating a difference between one or more input images of the object and one or more rendered images of the object. In particular, the camera pose at particular frames can be included in the loss function evaluation. Even more particularly, the rotations of particular bones around their parent joints can be included in the loss function evaluation. Even more particularly, the vertex 3D coordinates of the rest shape can be included in the loss function evaluation. For example, motion regularization terms used in evaluating the loss function can include a temporal smoothness term, a least motion term, and an as-rigid-as-possible term. As yet another example, shape regularization terms used in evaluating the loss function can include a Laplacian smoothness term and a canonicalization term to disambiguate multiple solutions up to rigid transformations. The one or more rendered images can include images rendered based on the machine-learned mesh model in combination with the camera parameters generated by the machine-learned camera model. The data generated by the machine-learned camera model can originate from the one or more input images. The pipeline can further instruct the system to receive an additional set of camera parameters. The pipeline can again further instruct the system to render an additional rendered image of the object based at least in part on the machine-learned mesh model and the additional set of camera parameters.

In some implementations, evaluating the loss function can include determining a first flow (e.g., using one or more optical flow techniques or the like) and a second flow (e.g., based on known changes across image rendering(s)). The first flow can be for the input image while the second flow can be for the rendered image. The loss function can be evaluated based at least in part on a comparison of the first flow and the second flow.

In some implementations, evaluating the loss function can include determining a first silhouette (e.g., using one or more segmentation techniques or the like) and a second silhouette (e.g., based on known locations of objects within a rendered image). The first silhouette can be for the input image while the second silhouette can be for the rendered image. The loss function can be evaluated based at least in part on a comparison of the first silhouette and the second silhouette.

In some implementations, evaluating the loss function can include determining a first texture data (e.g., using raw pixel data and/or various feature extraction techniques) and second texture data (e.g., using known texture data from rendering images). The first texture data can be for the input image while the second texture data can be for the rendered image. The loss function can be evaluated based at least in part on a comparison of the first texture data and the second texture data.

As one example, evaluating the loss function can include generating gradient signals. The gradient signals can be generated for the loss function by the comparison of the one or more characteristics of the input image of the object with one or more characteristics of the rendered image of the object. As an example, a gradient signal can be generated for the loss function comparing the first flow for the input image and the second flow for the rendered image. As another example, a gradient signal can be generated for the loss function comparing the first silhouette for the input image and the second silhouette for the rendered image. As yet another example, a gradient signal can be generated for the loss function comparing the first texture data associated with the input image and the second texture data associated with the rendered image.

In some implementations, obtaining the input image that depicts that object can include selecting a canonical image. In particular, the canonical image can be an image frame from a video. The canonical image can be selected automatically or manually. As one example for selecting the canonical input image, one or more candidate frames can be selected. A loss for each of the candidate frames can be evaluated. The candidate frame with the lowest final loss can be selected as a canonical frame.

In some implementations, the mesh model can include various shapes to construct the mesh model. As an example, the mesh model can be a polygon mesh. A polygon mesh can include a collection of vertices, a plurality of joints, a plurality of blend skinning weights for the plurality of joints relative to the plurality of vertices, and/or edges and faces that define the shape of a polyhedral object. In particular, the faces of the polygon mesh can consist of concave polygons, polygons with holes, simple convex polygons, as well as other more specific structures (e.g., triangles, quadrilaterals, etc.). As another example, the mesh model can be initialized to a subdivided icosahedron projected to a sphere. In some implementations, the linear blend skinning algorithm can be used to deform the mesh models. In some implementations, the plurality of joints and the plurality of blend skinning weights can be learnable.

In some implementations, the camera parameters can describe an object-to-camera transformation for the input image. As one example, different views of the 3D object can be created by applying a rigid 3D transformation matrix to a matrix of object-centered coordinates. By applying the object-to-camera transformation, the matrix of object-centered coordinates can be transformed to camera-centered coordinates. Even more particularly, the object on which the transformation is computed for can have a known geometric model. Calibration of the camera can begin by capturing an image of the real-world object and locating a set of landmark points in the image. The locations of the landmark points in the image (i.e. pose) can be found using any suitable technique.

In some implementations, the machine-learned camera model can include a convolutional neural network. For example, the convolutional neural network can estimate the camera pose. In particular, the convolutional neural network can represent the camera pose using its location vector and orientation quaternion. The convolutional neural network can be trained to determine the camera pose by being trained to minimize the loss between the ground-truth data and the estimated pose. As another example, the convolutional neural network can predict camera extrinsics (e.g., the camera's location in the world, what direction the camera is pointing, etc.). In particular, the camera extrinsics can be based at least in part on a camera calibration.

In some implementations, the camera parameters can describe intrinsic camera parameters (e.g., a focal length, image center, aspect ratio, etc.). The intrinsic camera parameters can be described for the input image. In particular, the intrinsic camera parameters can be based at least in part on the camera calibration.

In some implementations, dynamics of a skeleton can be shared. For example, if a skeleton reaches a determined threshold of similarity to another skeleton for which more data exists or a better 3D model exists (e.g., in the library), the system can apply the information from one 3D model to the other to improve a second 3D model (e.g., if there is not enough data to create the second 3D model at the same level of precision).

In some implementations, keypoint constraints can be incorporated. Additionally, shape template priors can potentially speed up inference and improve accuracy.

Thus, the present disclosure provides a template-free approach for 3D shape learning from one or more images (e.g., a single video). Example implementations adopt an analysis-by-synthesis strategy and forward-renders silhouette, optical flow, and/or color images, which is compared against the video observations to adjust the camera, shape, and/or motion parameters of the model. The proposed techniques are able to accurately reconstruct rigid and nonrigid 3D shapes (e.g., human, animals and categories in the wild) without relying on category or 3D shape priors.

The systems and methods of the present disclosure provide a number of technical effects and benefits. As one example technical effect, the proposed techniques are able to perform articulated shape reconstruction from limited image data (e.g., a monocular video) without reliance upon a prior template or category information. In particular, example implementations take advantage of two-frame optical flow to overcome the inherent incompleteness of the nonrigid structure and motion estimation problem. By enabling model reconstruction from limited data and without reliance of object- or category-specific priors, the techniques described herein are able to extend the range of objects for which accurate 3D models can be generated. In particular, many existing nonrigid shape reconstruction methods rely on a prior shape template, such as SMPL for human, SMAL for quadrupeds, and other category-specific 3D scans. In contrast, the proposed systems and methods can jointly recover the camera, shape, and articulation from a monocular video of an object without using shape templates or category information. By relying less on priors, the proposed systems and methods can be applied to a wider range of nonrigid shapes and better fit the data.

As another example technical effect, some example implementations automatically recover a nonrigid shape under the constraints of rigid bones under linear-blend skinning. The example implementations can combine coarse-to-fine re-meshing with soft-symmetric constraints to recover high-quality meshes.

Example experiments described further herein and conducted on example implementations of the proposed techniques demonstrate state-of-the-art reconstruction performance in the BADJA animal video dataset, strong performance against model-based methods on humans, and higher accuracy on two animated animals than A-CSM and SMALify that use shape templates.

Example Devices and Systems

FIG. 1A depicts a block diagram of an example computing system 100 that performs articulated shape reconstruction according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more 3D reconstruction models 120. For example, the 3D reconstruction models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example 3D reconstruction models 120 are discussed with reference to FIG. 2.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single 3D reconstruction model 120 (e.g., to perform parallel 3D reconstruction across multiple instances of input images).

More particularly, the 3D reconstruction model can jointly recover the camera, shape, and articulation from a series of images of an object without using shape templates or category information.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a streaming service). Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more 3D reconstruction models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 2.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the 3D reconstruction models 120 and/or 140 based on a set of training data 162. The training data 162 can include, for example, a set of one or more images. In some implementations, the one or more images can be directed to an object of interest. In some implementations, the one or more images can be strung together to become a video. In some implementations, the video can be a monocular video.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
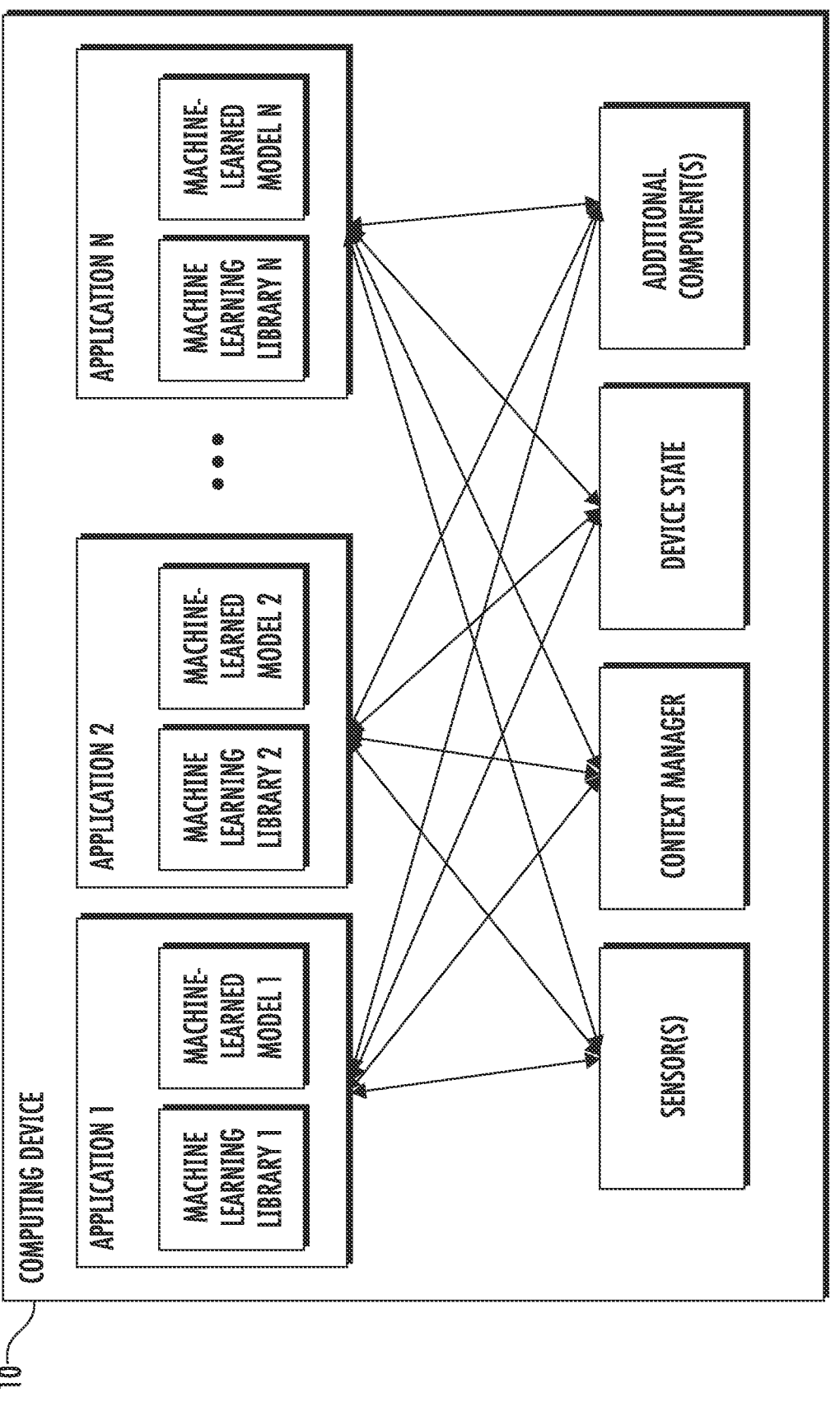
FIG. 1B depicts a block diagram of an example computing device that performs articulated shape reconstruction according to example embodiments of the present disclosure.

FIG. 1B depicts a block diagram of an example computing device 10 that performs according to example embodiments of the present disclosure. The computing device can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
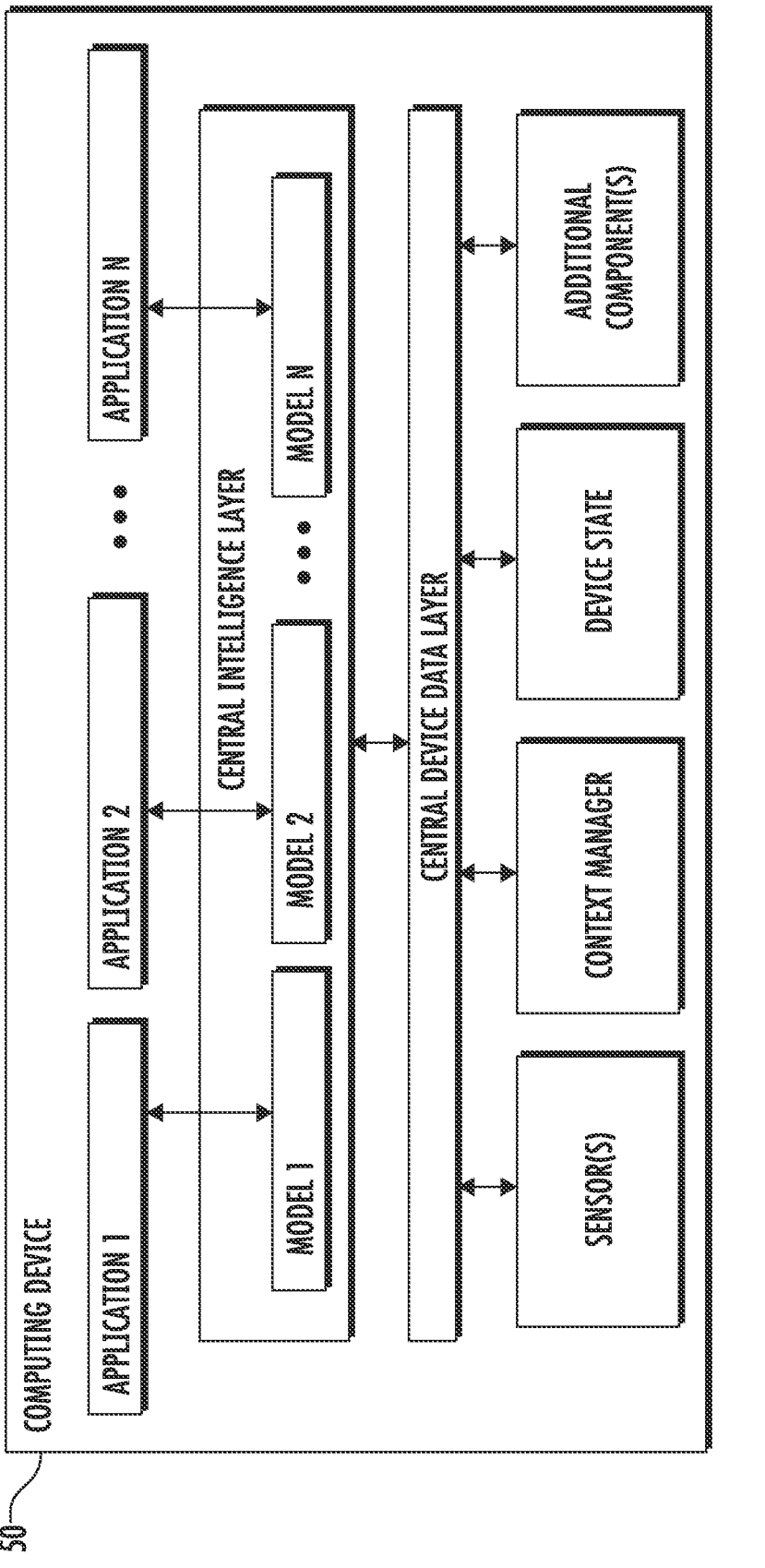
FIG. 1C depicts a block diagram of an example computing device that performs articulated shape reconstruction according to example embodiments of the present disclosure.

FIG. 1C depicts a block diagram of an example computing device 50 that performs according to example embodiments of the present disclosure. The computing device can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
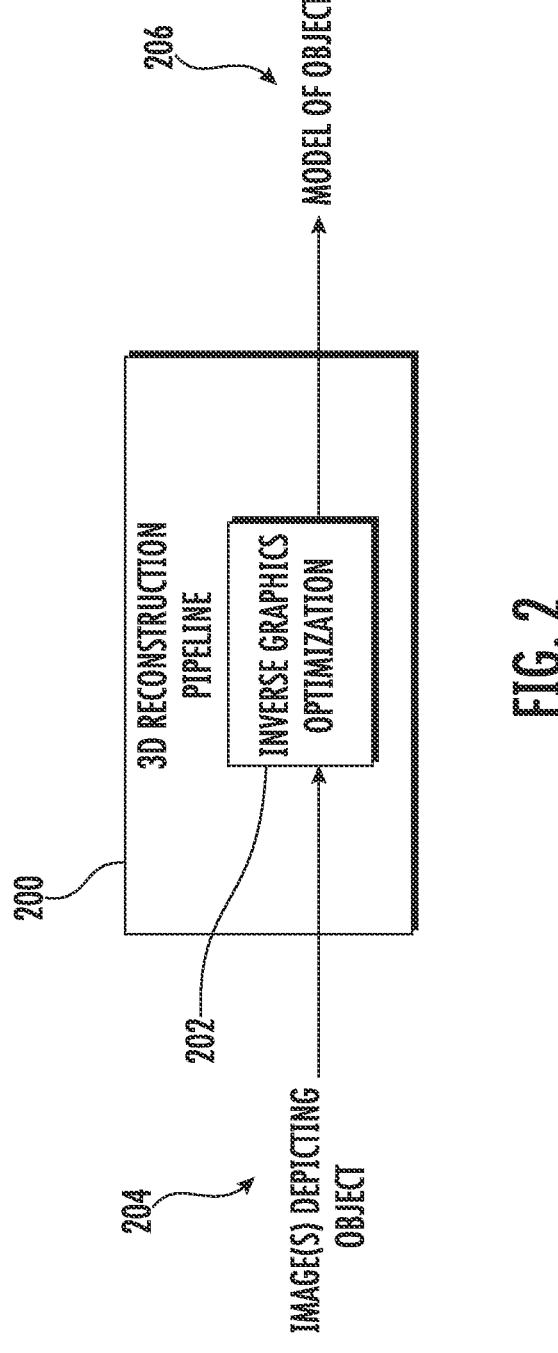
FIG. 2 depicts a block diagram of an example 3D reconstruction technique according to example embodiments of the present disclosure.

FIG. 2 depicts a block diagram of an example 3D reconstruction pipeline 200 according to example embodiments of the present disclosure. In some implementations, the 3D reconstruction pipeline 200 can be executed to receive a set of one or more images 204 that depict an object of interest (e.g., a monocular video directed to an object of interest) and, as a result of receipt of the image(s) 204, provide a reconstructed 3D model 206 of the object of interest. In some implementations, the 3D reconstruction pipeline 200 can include performing an Inverse Graphics Optimization 202 that includes solving an inverse graphics optimization problem which can jointly recover the object's rest shape, skinning weights, articulation, and/or camera parameters by video-based optimization.

Example Approach

Figure 3:
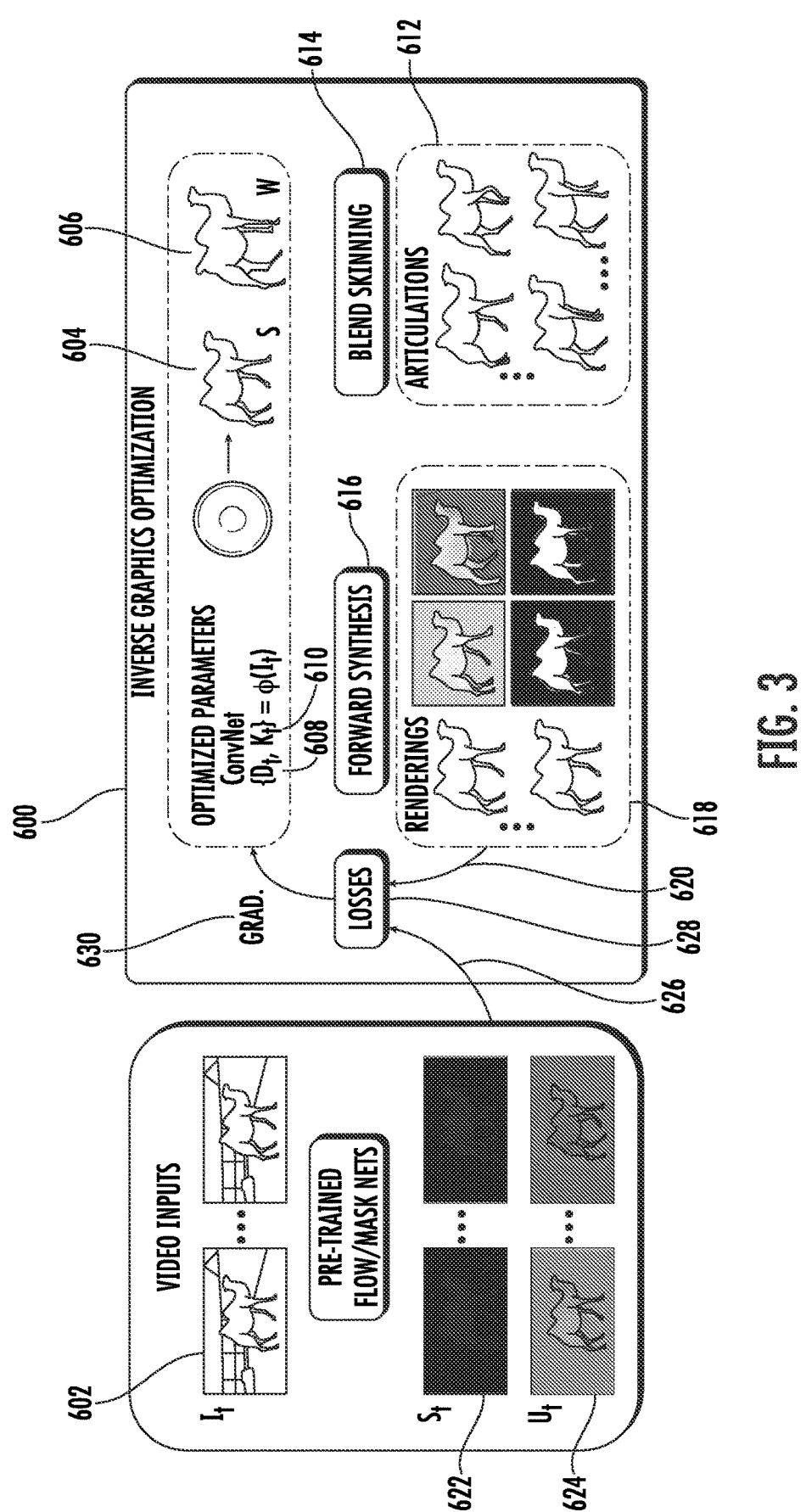
FIG. 3 depicts a flow diagram of a method overview of the learning articulated shape reconstruction method.

Some example implementations of the present disclosure leverage certain methods that solve the nonrigid 3D shape and motion estimation problem as an analysis-by-synthesis task given an input of one or more images, such as a monocular video $\{I_t\}$, as illustrated in FIG. 3. The methods described below can solve a "low-rank" shape and motion up to a scale by giving appropriate video measurements, despite the under-constrained nature of the problem. FIG. 3 illustrates an example embodiment of the basic steps of the computing system 600 where first the one or more images, more specifically a monocular video $\{I_t\}$, of an object of interest (e.g., an object that the user wishes to create a 3D model of) 602, may be input into the computing system. The object of interest can be indicated by a segmentation mask $\{S_t\}$ 622.

The computing system can solve an inverse graphics problem to jointly recover the object's rest shape S 604, skinning weights W 606, time-varying articulations as well as object-camera transformations $D_t$ 608, and/or camera parameters, otherwise referred to as camera intrinsics $K_t$ 610 by optimization methods (e.g., video-based optimization). The method can be repeated iteratively and at each iteration, a number of consecutive frames of images may be sampled. For example, C=8 pairs of consecutive frames may be randomly sampled. It will be appreciated that other numbers of consecutive frames may alternatively be used. In some implementations, the sampled frames may not be consecutive. Some frames in the video may be skipped, for example every other frame may be taken, or every third frame The randomly sampled frames can be fed to a convolutional neural network. The convolutional neural network can predict the time-varying camera and motion parameters. The rest shape S 604, otherwise referred to as a mean shape, can undergo a linear blend skinning process 614. The linear blend skinning process 614 can occur according to further details discussed below. The linear blend skinning process 614 can output an articulated rest shape 612, given certain parameters (e.g., predicted articulation parameters $D_t$ 608, skinning weights W 606, etc.).

Next, the computing system can forward-render texture, optical flow, and silhouette images with a differentiable renderer 616. Forward-rendering with a differentiable renderer can occur according to further details discussed below. Forward-rendering can output renderings 618 which can be input 620 into a loss function 628. Ground truth pixels, ground truth optical flow 624, ground truth segmentation $\{S_t\}$ 622, are also input 626 into the loss function 628.

The loss function 628 can be evaluated to generate one or more gradients 630. The one or more gradients 630 can be used update the camera $K_t$ 610, shape S 604, and articulation parameters $D_t$ 608. The one or more gradients 630 can be used to update the camera $K_t$ 610, shape S 604, and articulation parameters $D_t$ 608 using gradient descent to minimize the difference between the rendered output Y=f(X) and ground-truth video measurements Y* at test time. To deal with the fundamental ambiguities in object shape S 604, deformation and camera motion, the following disclosure can leverage a "low-rank" but expressive parameterization of deformation, rich constraints provided by optical flow and raw pixels, and appropriate regularization of object shape deformation and camera motion.

Example Forward-Synthesis Model

Continuing the example steps of the computing system above, in some implementations, the computing system can forward-render texture, optical flow, and silhouette images with a differentiable renderer 616. Given a frame index t and model parameters X, the measurements of the corresponding frame pair {t, t+1}, including color images renderings $\{\hat{I}_t, \hat{I}_{t+1}\}$, object silhouettes renderings $\{\hat{S}_t, \hat{S}_{t+1}\}$ and forward-backward optical flow renderings $\{\hat{u}_t^+, \hat{u}_{t+1}^-\}$ can be synthesized.

In some implementations, the object shape S=$\{\bar{V}, \bar{C}, F\}$ can be represented as a mesh with N colored vertices and a fixed topology of M faces. The mesh may be a triangular mesh. Time-varying articulations $D_t$ can be modeled by $V_t=G_{0,t}(\bar{V}+\Delta V_t)$ where $\Delta V_t$ can be a per-vertex motion field applied to the rest vertices $\bar{V}$, and $G_{0,t}=(R_0|T_0)_t$ can be an object-camera transformation matrix (index 0 can be used to differentiate from bone transformations indexed from 1 in deformation modeling leveraged by the computing system). Finally, a perspective projection $K_t$ can be applied before rasterization, where principal point $(p_x, p_y)$ can be assumed to be constant and focal length $f_t$ varies over time to deal with zooming.

In some implementations, object silhouette and color images can be rendered with a differentiable renderer. Color images can be rendered given per-vertex appearance C and constant ambient light. Synthesizing the forward flow $u_t^+$, can be accomplished by take surface positions $V_t$ corresponding to each pixel in frame t, computing their locations $V_{t+1}$ in the next frame, then taking the difference of their projections, for example:

$$\begin{pmatrix} u_{x,t}^+ \\ u_{y,t}^+ \end{pmatrix} = \begin{pmatrix} P_t^{(1)} V_t / P_t^{(3)} V_t \\ P_t^{(2)} V_t / P_t^{(3)} V_t \end{pmatrix} - \begin{pmatrix} P_{t+1}^{(1)} V_{t+1} / P_{t+1}^{(3)} V_{t+1} \\ P_{t+1}^{(2)} V_{t+1} / P_{t+1}^{(3)} V_{t+1} \end{pmatrix},$$

where $P^{(i)}$ can denote the ith row of the projection matrix P.

Example Deformation Modeling

As described above, in some implementations, the computing system can construct deformation modeling of the object of interest. Deformation modeling can leverage multiple computing processes. Computing processes leveraged for deformation modeling can include linear-blend skinning (continuing the example steps of the computing system above) and parametric skinning. The number of unknowns and constraints to solve the inverse problem can be analyzed. Given T frames of a video, $$\#\text{Unknowns} = 3N + 3NT + 6T + (T+2),$$

$$(\bar{V})(\Delta V)(R_0, T_0)(K)$$

which can grow linearly with the number of vertices. Thus, an expressive but low-rank representation of shape and motion can be generated.

Continuing the example steps of the computing system above, in some implementations, the computing system can leverage linear-blend skinning. Some implementations of modeling deformation can utilize modeling deformation as per-vertex motion $\Delta V_t$. In other implementations, a linear-blend skinning model can constrain vertex motion by blending B rigid "bone" transformations $\{G_1, \ldots, G_B\}$, which can reduce the number of parameters and make optimization easier. Besides bone transformations, the LBS model can define a skinning weight matrix $W \in \mathbb{R}^{B \times N}$ that attaches the vertices of a rest shape vertices $\bar{V}$ to the set of bones. Each vertex can be transformed by linearly combining the weighted bone transformations in the object coordinate frame and then transformed to the camera coordinate frame, for example:

$$V_{i,t}=G_{0,t}(\Sigma_j w_{j,t} G_{j,t}) V_i$$

where i can be the vertex index, and j can be the bone index. In some implementations, skinning weights and time-varying bone transformations can be learned jointly.

In some implementations, the computing system can leverage parametric skinning. The skinning weights can be modeled as a mixture of Gaussians, for example:

$$W_{j,i} = Ce^{-\frac{1}{2}(v_i - J_j)^T Q_j (v_i - J_j)}$$

where $J_j \in \mathbb{R}^3$ can be the position of j-th bone, $Q_j$ can be the corresponding precision matrix that determines the orientation and radius of a Gaussian, and C can be a normalization factor that can ensure the probabilities of assigning a vertex to different bones sum up to one. In particular, $W \rightarrow \{Q, J\}$ can be optimized. It is worth noting that in some implementations, the mixture of Gaussian models reduces the number of parameters for skinning weights from NB to 9B. In further implementations, the mixture of Gaussian models can also guarantee smoothness. The number of shape and motion parameters can now be expressed by:

$$\text{\#Unknowns} = 3N + 6BT + 9B + 6T + (T + 2),$$

$$(\bar{V})(G_{1 \ldots B})(J, Q)(R_0, T_0)(K)$$

which can grow linearly with respect to the number of frames and bones.

Example Self-Supervised Learning from a Video

In some implementations, rich supervision signals from dense optical flow and raw pixels can be exploited. Furthermore, in some implementations, shape and motion regularizers can be exploited to further constrain the problem.

In some implementations, inverse graphics loss can be leveraged. For example, the supervision for the analysis-by-synthesis pipeline can include the silhouette loss, texture loss, and optical flow loss. The silhouette loss compares rendered textures to measured silhouette, for example using an L2 loss. The texture loss compares rendered textures to measured textures, for example using an L1 loss and/or a perceptual distance. The optical flow loss compares rendered optical flows to measured optical flows, for example using an L2 loss. For example, given a pair of rendered outputs $(\hat{S}_t, \hat{I}_t, u_t)$ and measurements $(S_t, I_t, u_t)$, the inverse graphics loss can be computed as, $$3L_{IG} = \Sigma_t(\beta_1 \|\hat{S}_t - S_t\|_2^2 + \beta_2 \sigma_t \|u_t - u_t\|_2 + \beta_3 \|\hat{I}_t - I_t\|_1 + \beta_4 \text{pdist} (\hat{I}_t, I_t)$$

where $\{\beta_1, \ldots, \beta_4\}$ can be weights empirically chosen, $\sigma_t$ can be the normalized confidence map for flow measurement, and $\text{pdist}(\bullet, \bullet)$ can be the perceptual distance. In some implementations, applying L1 loss to optical flow can be better than L2 loss. For example, due to the L1 flow loss being more tolerant to outliers (e.g., nonrigid motion).

In some implementations, shape and motion regularization can be leveraged. For example, general shape and temporal regularizers can be exploited to further constrain the problem. A Laplacian smoothness operation can be used to enforce surface smoothness, for example:

$$L_{shape} = \left\| \bar{V}_i - \frac{1}{|N_i|} \sum_{j \in N_i} \bar{V}_j \right\|^2.$$

Motion regularization can include one or more of a least-motion term, an ARAP (as-rigid-as-possible) deformation term, and a temporal smoothness term. The least-motion term can encourage the articulated shape to stay close to the rest shape, and may be based on a difference between the mesh vertices of the object and the rest vertices of the object, for example:

$$L_{least-motion} = \Sigma_{i=1}^V \|V_{i,t} - \bar{V}_i\|_2,$$

which can be effective to address the shape-deformation ambiguity, i.e., modifying the shape can be expressed as applying bone transformation to the original shape. An ARAP term can be used to encourage natural deformation, which may be based on a difference between inter-vertex distances in consecutive frames, for example:

$$L_{ARAP} = \Sigma_{i=1}^V \Sigma_{j \in N_i} |\|V_{i,t} - V_{j,t}\|_2 - \|V_{i,t+1} - V_{j,t+1}\|_2|.$$

In some implementations, first-order, temporal smoothing can be applied on camera rotation (j=0) and bone rotations (j=1, . . . ,B), such as:

$$3L_{temporal} = \Sigma_{j=0}^B \|\log(R_{j,t} R_{j,t+1}^T)\|_2$$

where rotations can be compared using geodesic distance.

In some implementations, soft-symmetry constraints can be leveraged. For example, the reflectional symmetry structure exhibited in common object categories can be exploited. For instance, a soft-symmetry constraint can be posed along the y-z plane, i.e., $(n_0, d_0) = (1,0,0,0)$ in the object frame, for both the rest shape and skinning weights. In some cases, the rest shape and reflected rest shape may be similar, $$3L_{symm-shape} = L_{cham}(\{\bar{V}, F\}, \{H\bar{V}, F\})$$

where $H = I - 2n_0 n_0^T$ can be the Householder reflection matrix, and the Chamfer distance can be computed as bidirectional pixel-to-face distances. Similarly, for the rest bones J can be computed by $$3L_{symm-bone} = L_{cham}(J, HJ).$$

Finally, a canonicalization term can be applied, $$3L_{canonical} = \|R_{0,t*} n_0 - n*\|_2$$

where t* can be the canonical frame and n* can be the symmetry plane in that frame. For example, the canonical camera pose can be biased to align with the symmetry plane. The symmetry plane can be initialized with an approximate value and optimized. The total loss can be a weighted sum of all losses with the weights empirically chosen and held constant for all experiments.

Example Implementation Details

In some implementations, camera and poses can be leveraged for implementation details. In some implementations, the time-varying parameters $\{D_t, K_t\}$ can be directly optimized. In some implementations, time-varying parameters $\{D_t, K_t\}$, can be parameterized as predictions from a convolutional network given an input image $I_t$, $$\psi_w(I_t) = (K, G_0, G_1, G_2, \ldots, G_B)_t,$$

where one parameter can be predicted for focal length, a number of parameters (e.g., four) can be predicted for each bone rotation parameterized by quaterion, and a number (e.g. three) can be predicted for each translation. The numbers can be added to 1+7(B+1) numbers in total at each frame. The predicted camera and pose predictions can be used to synthesize videos that are compared against the raw measurements Y*, which generate gradients to update the weights w. The network can learn a joint basis for cameras and poses that can be easier to optimize than the raw parameters.

In some implementations, silhouette and flow measurements can be leveraged for implementation details. An assumption that a reliable segmentation of the foreground object is provided can be made. The segmentations can be manually annotated or estimated using instance segmentation and tracking methods. Reasonable optical flow estimation can be leveraged, which can be provided by state-of-the-art flow estimators trained on a mixture of datasets. Notably, learning articulated shape reconstruction can recover from some bad flow initialization and get better long-term correspondences.

Figure 4:
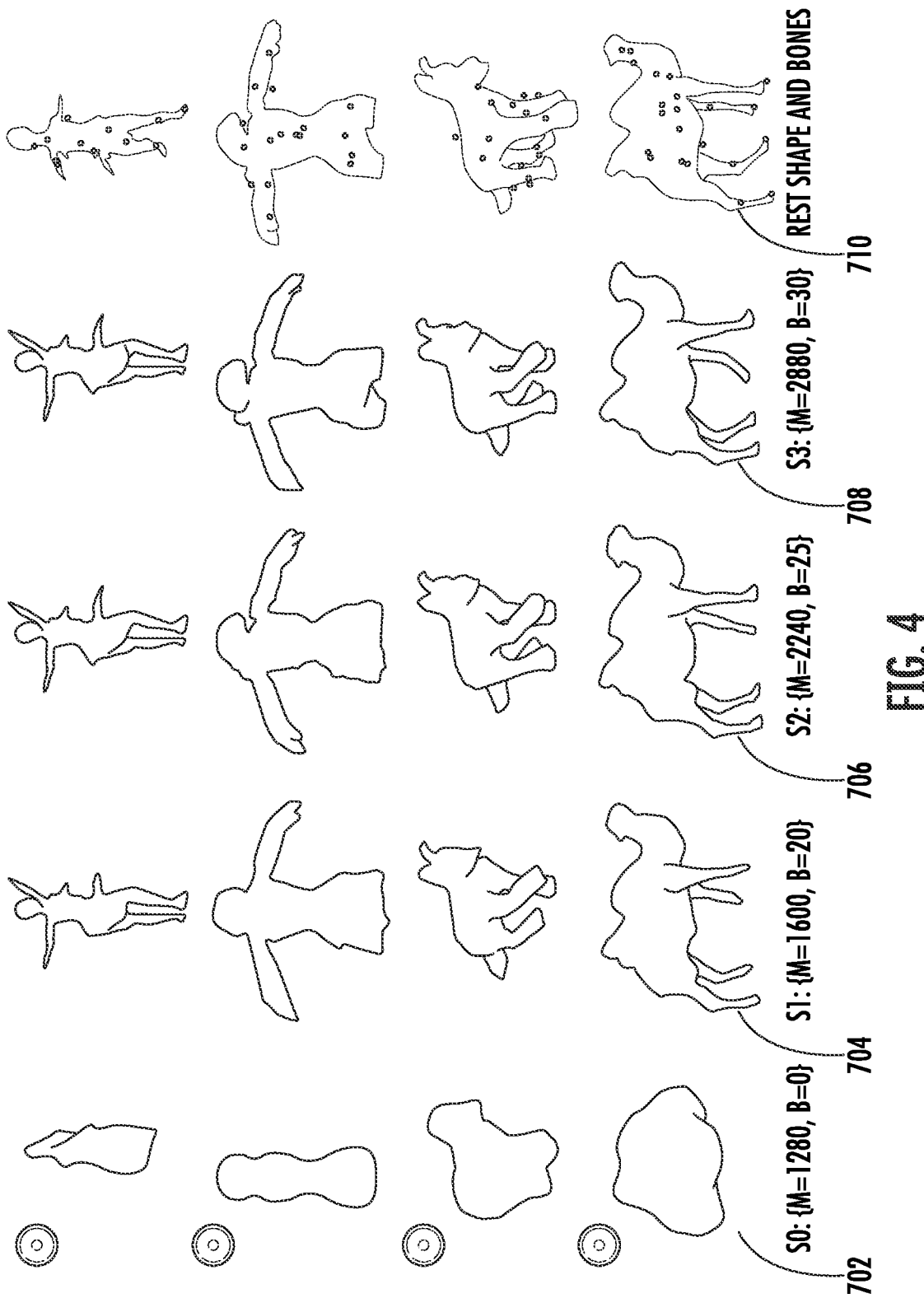
FIG. 4 illustrates examples of coarse-to-fine reconstruction.

In some implementations, coarse-to-fine reconstruction can be leveraged for implementation details as shown in FIG. 4. A coarse-to-fine strategy to reconstruct high-quality meshes can be utilized. For S0, 702, a rigid object can be assumed and the rest shape and cameras $\{S, G_{0,t}, K_t\}$ can be optimized for L epochs. For S1-S3, 704, 706, and 708 all the parameters $\{S, D_t, K_t\}$ can be jointly optimized and re-meshing can be performed after every L epochs, which can be repeated a number of times. (e.g., it can be repeated three times, a first remeshing 704, a second remeshing 706, and a third remeshing 708). After each remeshing, both the number of vertices and the number of bones can increase, as illustrated in FIG. 4.

In some implementations, initialization can be leveraged for implementation details. The rest shape can be initialized to a subdivided icosahedron projected onto a sphere at S0 702. The rest bones can be initialized by running K-means on the vertices' coordinates at S1-S3, 704, 706, and 708. The first frame of a video can be chosen as the canonical frame and the canonical symmetry plane n* can be either manually given (by providing one of y-z plane or x-y plane), or chosen from eight hypotheses whose azimuth and elevation can be uniformly spaced on a semisphere, by running S0 702 for each hypothesis in parallel and picking up the one with the lowest final loss.

Example 2D Keypoint Transfer on Animal Videos

For example, a user can use the computing system on an animal video dataset, which can provide a number of real animal videos (e.g., nine real animal videos) with 2D keypoint and mask annotations. The data can be derived from a video segmentation dataset or online stock footage. It can include a number of videos of a number of animals such as dogs (e.g., three videos of dogs), horsejump (e.g., two videos of horse jumping), and camel, cow, bear as well as impala (e.g., one each of camel, cow, bear and impala).

To approximate the accuracy of 3D shape and articulation recovery, a percentage of correct keypoint transfer (PCK-T) can be used. Given a reference and target image pair with 2D keypoint annotations, the reference keypoint can be transferred to the target image, and labeled as "correct" if the transferred keypoint is within some threshold distance $d_{th}=0.2\sqrt{|S|}$ from the target keypoint, where |S| can be the area of the ground-truth silhouette. Transfer points can be transferred by re-projection from the reference frame to the target frame given the articulated shape and camera pose estimations. If the back-projected keypoint lies outside the reconstructed mesh, its nearest neighbor that intersects the mesh can be re-projected. The accuracy can be averaged over all T(T−1) pairs of frames.

A taxonomy of alternative methods for animal reconstruction that can be used as a baseline for comparison purposes is illustrated in Table 1 below. (1) refers to model-based shape optimization. (2) refers to model-based regression. (3) refers to category-specific reconstruction. (4) refers to template-free approaches. S refers to single view. V refers to video or multi-view data. I refers to image. J2 refers to 2D joints. J3 refers to 3D joints. M refers to 2D masks. V3 refers to 3D meshes. C refers to camera matrices. 0 refers to optical flow. Quad refers to quadruped animals. † refers to only representative categories being listed. * refers to implementation being unavailable. SMALST is a model-based regressor trained for zebras. It takes an image as input and predicts shape, pose and texture for the SMAL model. UMR is a category-specific shape estimator trained for several categories, including birds, horses and other categories that have a large collection of annotated images. The performance of the horse model is reported since the models of other animal categories are not available. A-CSM learns a category-specific canonical surface mapping and articulations from an image collection. At test time, it takes an image as input and predicts the articulation parameters of a rigged template mesh. It provides 3D templates for 27 animal categories and an articulation model for horses, which is used throughout the experiments. SMALify is a model-based optimization approach that fits one of five categories (including cat, dog, horse, cow and hippo) of SMAL models to a video or a single image. All the video frames are provided with ground-truth keypoint and mask annotations. Finally, a detection-based method is included, OJA, which trains an hourglass network to detect animal keypoints (indicated by Detector), and post-process the joint cost maps with a proposed optimal assignment algorithm.

TABLE 1

| | Related work in nonrigid shape reconstruction. | | | | |
|---|---|---|---|---|---|
| | Method | category | template | Test input | train |
| (1) | SMPL | human | SMPL | S:J2, M | None |
| | SMAL | quadx5 | SMAL | S:J2, M | None |
| | SMALR | quadx12 | SMAL | S:J2, M | None |
| | SMALify | quadx5 | SMAL | V:J2, M | None |
| (2) | VIBE | human | SMPL | V:I | J2, J3 |
| | Avian | bird | SLBM | S:I | J2, M |
| | SMALST | zebra † | SMAL | S:I | J2, V3 |
| | *WLDO | dog | SMAL | S:I | J2, M |
| (3) | CMR | bird † | SfM-hull | S:I | J2, M, C |
| | UCMR | bird † | cate-mesh | S:I | M |
| | UMR | bird † | sphere | S:I | M |
| | *IMR | animals † | cate-mesh | S:I | M |
| | A-CSM | bird † | cate-mesh | I | M |
| | WSD | dolphin † | cate-mesh | V:J2, M | None |
| | *VMR | bird † | cate-mesh | V:M | None |
| (4) | PIFuHD | human | None | S:I | V3 |
| | NRSFM | any | None | V:J2 | None |
| | *A3DC | any | cylinders | V:stroke | None |
| | LASR | any | sphere | V:O, M | None |

Figure 5:
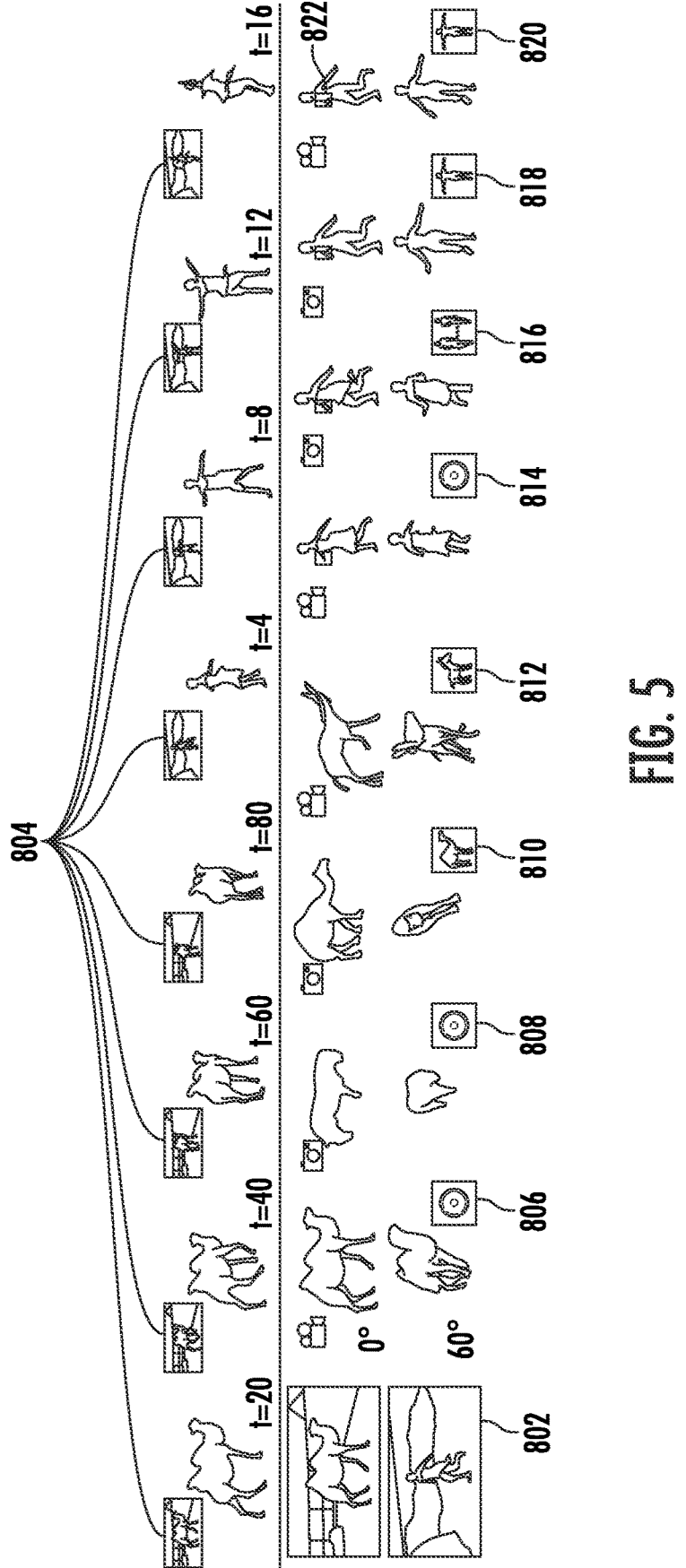
FIG. 5 illustrates an example of a visual comparison of human and animals of mesh reconstruction using various mesh reconstruction methods.

Example qualitative results of 3D shape reconstruction are illustrated in FIG. 5. FIG. 5 illustrates example 3D shape reconstruction results based on camel and human data from LASR as well as competitors using a reference image 802. The shape reconstruction results from LASR are illustrated with reference to various times of the series of images (e.g., video) at 804. Further shape reconstruction results from LASR at 0° rotation and 60° rotation is illustrated at 806. Further shape reconstruction results from UMR-horse at 0° rotation and 60° rotation is illustrated at 808. Further shape reconstruction results from A-CSM (camel template) at 0° rotation and 60° rotation is illustrated at 810. Further shape reconstruction results from SMALify horse at 0° rotation and 60° rotation is illustrated at 812. Further shape reconstruction results from LASR at 0° rotation and 60° rotation is illustrated at 814, specifically illustrating the humanoid figure. Further shape reconstruction results from PIFuHD at 0° rotation and 60° rotation is illustrated at 816. Further shape reconstruction results from SMPLify-X at 0° rotation and 60° rotation is illustrated at 818. Further shape reconstruction results from VIBE at 0° rotation and 60° rotation is illustrated at 820. LASR can jointly recover the camera, shape, and articulation from one or more images (e.g., a monocular video) of an object without using shape templates or category information. By relying on less priors, LASR can apply to a wider range of nonrigid shapes and better fits the data. The results from LASR 806, recovered both humps of the camel which are missing from the results of the other methods 808, 810, and 812. Furthermore, the dancer's cloth silk ribbon 822 can be reconstructed by the results form LASR 814 and PIFuHD 816 but confuses SMPLify-X 818 and VIBE 820 as the right arm of the dancer.

Figure 6:
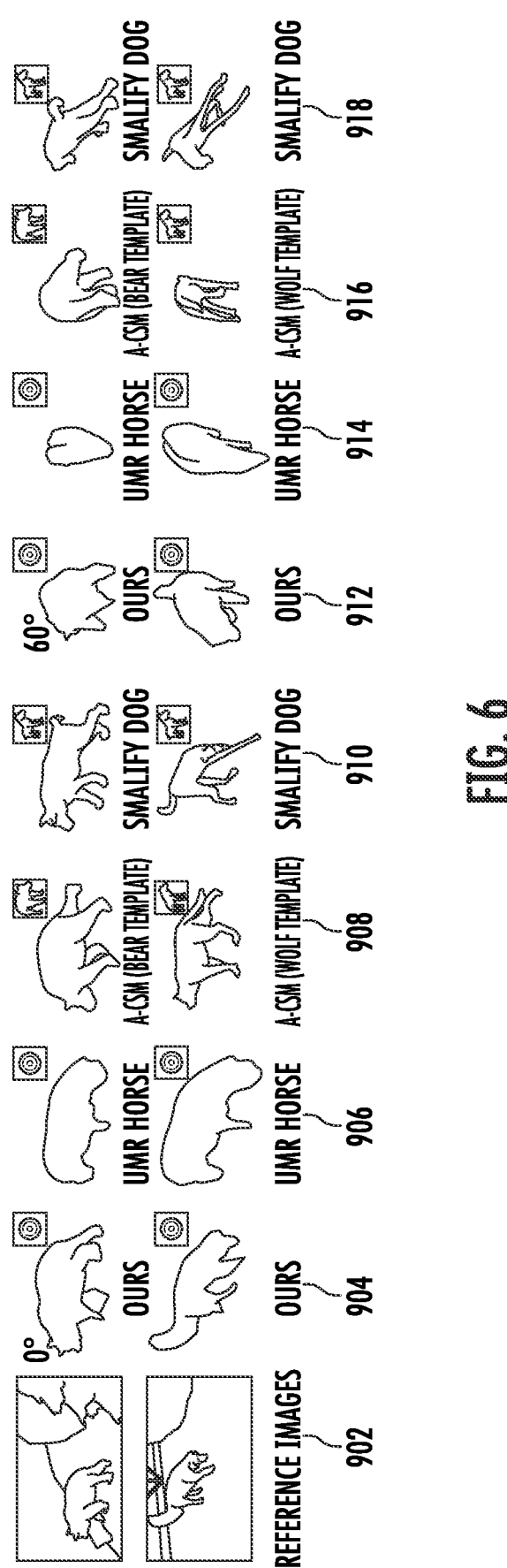
FIG. 6 illustrates another example of a visual comparison of human and animals of mesh reconstruction using various mesh reconstruction methods.

Another example of qualitative results of 3D shape reconstruction are shown in FIG. 6, where we compare with UMR, A-CSM and SMALify on bear and dog data 902 (e.g., bear and dog video). The reconstruction of the first frame of the video is illustrated from two viewpoints. Compared to UMR that also does not use a shape template, LASR reconstruct more fine-grained geometry. Compared to A-CSM and SMALify that uses a shape template LASR recovers instance-specific details, such as the fluffy tail of the dog, and a more natural pose. An example shape reconstruction result from LASR is illustrated at 0° rotation 904 and 60° rotation 914. An example shape reconstruction result from UMR horse is illustrated at 0° rotation 906 and 60° rotation 914. An example shape reconstruction result from A-CSM (wolf template) is illustrated at 0° rotation 908 and 60° rotation 916. An example shape reconstruction result from SMALify dog is illustrated at 0° rotation 910 and 60° rotation 918.

Quantitative results of keypoint transfer are shown in Table 2 shown below. Given all 3D reconstruction baselines are category-specific and might not provide the exact model for some categories (such as camel), the best model or template for each animal video was selected. Compared with 3D reconstruction baselines, LASR is better for all categories, even on the categories the baselines are trained for (e.g., LASR: 49.3 vs UMR: 32.4 on horsejump-high). Replacing the ground-truth segmentation mask with an object segmentor, PointRend, the performance of LASR drops, but is still better than all the reconstruction baselines. Compared to detection-based methods, our accuracy is higher on the horsejump video, and close to the baseline on other videos. LASR also shows a large improvement compared to the initial optical flow (81.9% vs 47.9% for camel). (2) refers to Model-based regression. (3) refers to category-specific reconstruction. (4) refers to free-form reconstruction. † refers to methods that do not reconstruct 3D shape. * refers to methods that is not designated for such category. Best results are underlined, and bolded if reconstruct a 3D shape.

TABLE 2

| 2D Keypoint transfer accuracy | | | | | |
|---|---|---|---|---|---|
| Method | camel | dog | COWS | horse | bear |
| (2)SMALST | 49.7 * | 12.8 * | 59.7 * | 10.4 * | 67.2 * |
| (3)A-CSM | 60.2 * | 24.5 * | 65.7 * | 21.5 | 39.7 * |
| (3)UMR | 35.1 * | 38.5 * | 68.1 * | 32.4 | 56.9 * |
| (4)LASR | 81.9 | 65.8 | 83.7 | <u>49.3</u> | 85.1 |
| (4)+Auto-mask | 78.9 | 59.5 | 82.7 | 42.2 | 82.6 |
| †Static | 51.9 | 13.0 | 55.5 | 8.8 | 58.6 |
| †Detector | 73.3 | 66.9 | 89.2 | 26.5 | 83.1 |
| †OJA | 87.1 | 66.9 | 94.7 | 24.4 | 88.9 |
| †Flow-VCN | <u>47.9</u> | <u>25.7</u> | <u>60.7</u> | 14.4 | <u>63.8</u> |

Figure 7:
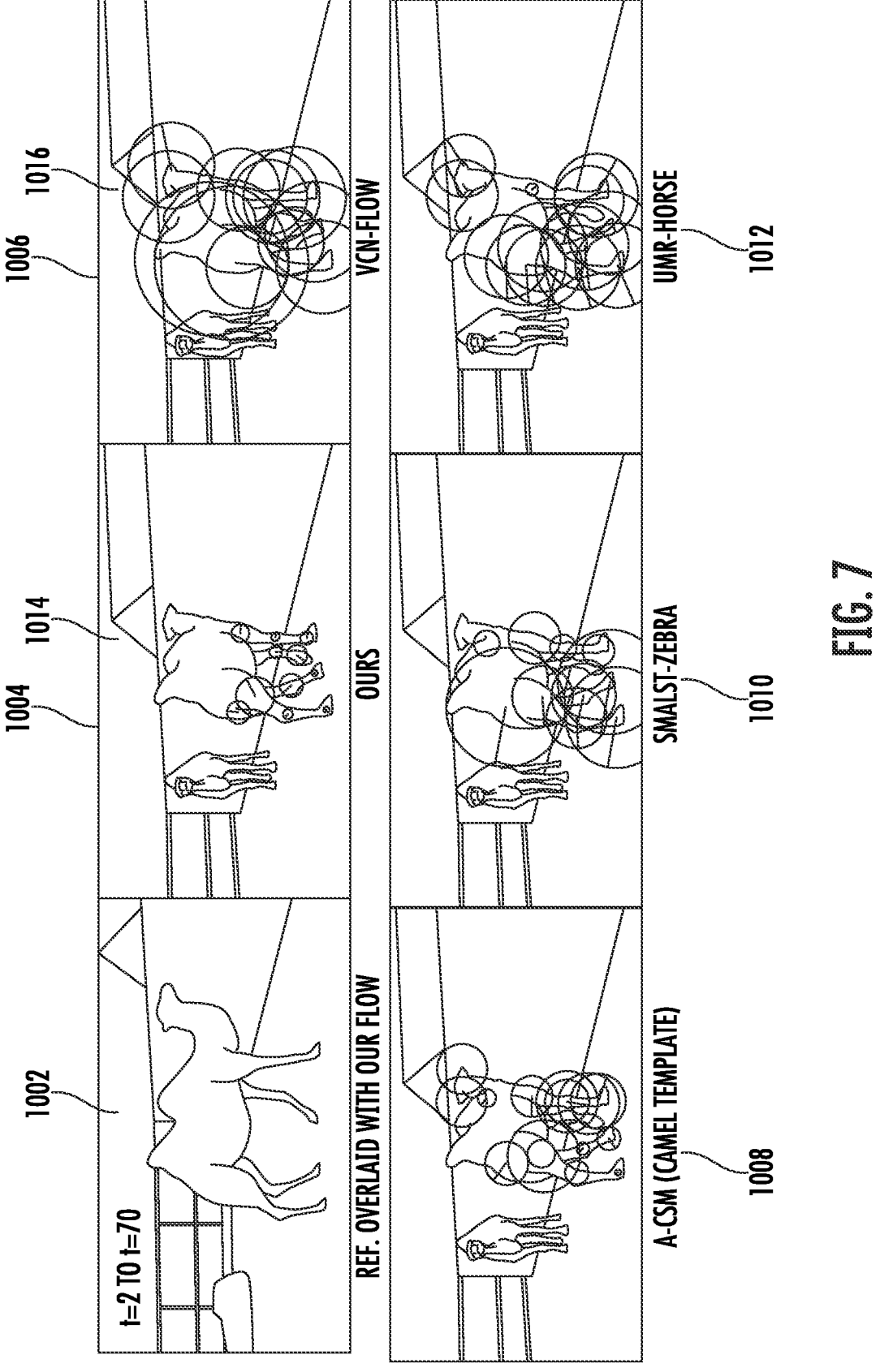
FIG. 7 illustrates an example of keypoint transfer using various keypoint transfer methods.

LASR shows a large improvement compared to the initial optical flow especially between long-range frames as shown in FIG. 7. FIG. 7 illustrates example keypoint transfers between frame 2 and frame 70 of a sample camel video. The distance between transferred keypoint and target annotation is represented by the radius of circles. A correct transfer is marked with a solid circle 1014 and a wrong transfer is marked with a dotted line 1016. A reference image is illustrated with the LASR flow overlaid on top 1002. An example image is illustrated with keypoint transfers between frame 2 and frame 70 using LASR 1004. An example image is illustrated with keypoint transfers between frame 2 and frame 70 using VCN-flow 1006. An example image is illustrated with keypoint transfers between frame 2 and frame 70 using A-CSM (camel template) 1008. An example image is illustrated with keypoint transfers between frame 2 and frame 70 using SMALST-zebra 1010. An example image is illustrated with keypoint transfers between frame 2 and frame 70 using UMR-horse 1012.

Example Mesh Reconstruction on Articulated Objects

For one example mesh reconstruction on articulated objects, to evaluate mesh reconstruction accuracy, a video dataset of five articulated objects with ground-truth mesh and articulation was used, including one dancer video, one German shepherd video, one horse video, one eagle video and one stone golem video. A rigid object was also included, Keenan's spot to evaluate performance on rigid object reconstruction and ablation for S0 stage.

Most prior work on mesh reconstruction assumes given camera parameters. However, both the camera and the geometry are unknown in certain cases that LASR can model, which leads to ambiguities in evaluation, including scale ambiguity (exists for all monocular reconstruction) as well as the depth ambiguity (exists for weak perspective cameras as used in UMR, A-CSM, VIBE, etc.). To factorize out the unknown camera matrices, two meshes were aligned with a 3D similarity transformation solved by iterative-closest-point. Then, the bidirectional Chamfer distance is adopted as the evaluation metric. 10 k points were randomly sampled uniformly from the surface of predicted and ground-truth meshes, and the average distance between the nearest neighbor for each point in the corresponding point cloud was computed.

Besides A-CSM, SMALify, and UMR for animal reconstruction, SMPLify-X, VIBE, and PiFUHD was compared against LASR for human reconstruction. SMPLify-X is a model-based optimization method for expressive human body capture. A female SMPL model for the dancer sequence was used, and the keypoint inputs estimated from OpenPose were provided. VIBE[19] is a state-of-the-art model-based video regressor for human pose and shape inference. PIFuHD is a state-of-the-art free-form 3D shape estimator for clothed humans. It takes a single image as input and predicts an implicit shape representation, which is converted to a mesh by marching cube algorithm. To compare with SMALify on dog and horse, 18 keypoints were manually annotated per-frame, and initialized with the corresponding shape template.

Figure 8:
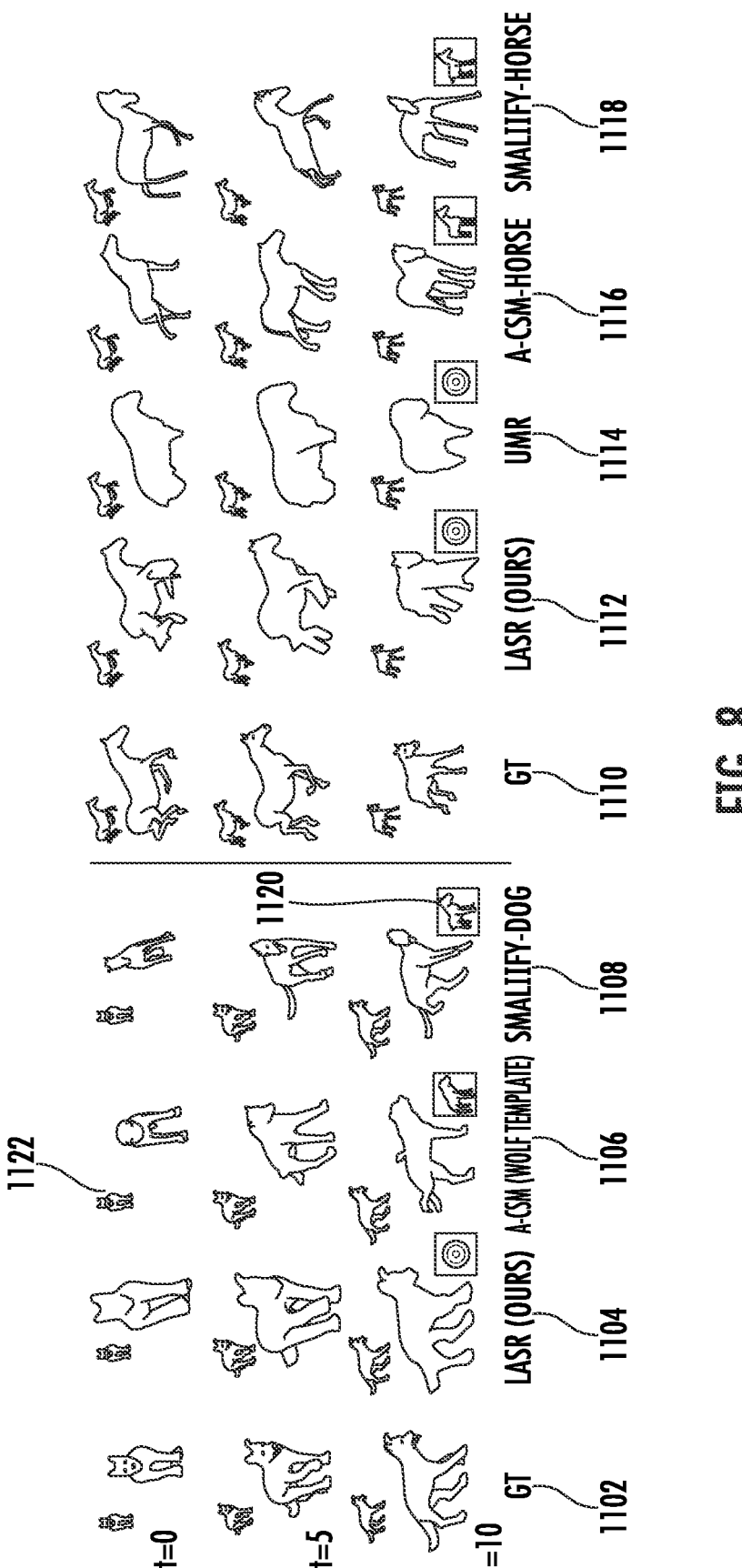
FIG. 8 illustrates an example of shape and articulation reconstruction results at different time stamps using various methods of shape and articulation reconstruction.

The visual comparison on human and animals are shown in FIG. 5 as well as FIG. 8. FIG. 8 illustrates the shape and articulation reconstruction results at different time stamps on our synthetic dog and horse sequences. An example shape and articulation reconstruction of a dog at t=0, t=5 and t=10 is illustrated using GT 1102. An example shape and articulation reconstruction of a dog at t=0, t=5 and t=10 is illustrated using LASR 1104. An example shape and articulation reconstruction of a dog at t=0, t=5 and t=10 is illustrated using A-CSM (wolf template) 1106. An example shape and articulation reconstruction of a dog at t=0, t=5 and t=10 is illustrated using SMALify-dog 1108. An example shape and articulation reconstruction of a horse at t=0, t=5 and t=10 is illustrated using GT 1110. An example shape and articulation reconstruction of a horse at t=0, t=5 and t=10 is illustrated using LASR 1112. An example shape and articulation reconstruction of a horse at t=0, t=5 and t=10 is illustrated using UMR 1114. An example shape and articulation reconstruction of a horse at t=0, t=5 and t=10 is illustrated using A-CSM-horse 1116. An example shape and articulation reconstruction of a horse at t=0, t=5 and t=10 is illustrated using SMALify-horse 1118. The reference is illustrated at the upper left-hand corner of each reconstruction 1122. The template mesh used is illustrated in the bottom right 1120. Compared to template-based method (UMR 1114), LASR 1112 successfully reconstructs the four legs of the horse. Compared to template-based methods (A-CSM 1106 and SMALify 1108), LASR 1104 successfully reconstructs the instance-specific details (ears and tails of the dog) and recovers a more natural articulation.

The quantitative results are illustrated in Table 3 below. On the dog video, LASR is better than all the baselines (0.28 vs A-CSM: 0.38). LASR may be better because A-CSM and UMR are not trained specifically for dogs (although A-CSM uses a wolf template), and SMALify cannot reconstruct a natural 3D shape from limited keypoint and silhouette annotations. For the horse video, LASR is slightly better than A-CSM, which uses a horse shape template, and outperforms the rest baselines. For the dancer sequence, LASR is not as accurate as baseline methods (0.35 vs VIBE: 0.22), which is expected given that all baselines either use a well-designed human model, or have been trained with 3D human mesh data, while LASR does not have access to 3D human data. For the stone golem video, LASR is the only one that reconstructed a meaningful shape. Although the stone golem has a similar shape to a human's, OpenPose does not detect joints correctly, leading to the failure of SMALify-X, VIBE and PiFUHD. The best results are bolded. "-" refers to a method that does not apply to a particular sequence.

TABLE 3

Mesh reconstruction error in terms of Chamfer distance on the animated object dataset.

| Method | dancer ↓ | dog ↓ | horse ↓ | golem ↓ |
|---|---|---|---|---|
| SMPLify-X | 0.26 | — | — | — |
| VIBE | 0.22 | — | — | — |
| A-CSM | — | 0.38 | 0.26 | — |
| SMALify | — | 0.51 | 0.41 | — |
| PIFuHD | 0.28 | — | — | — |
| UMR | — | 0.44 | 0.42 | — |
| LASR | 0.35 | 0.28 | 0.23 | 0.16 |

Figure 9:
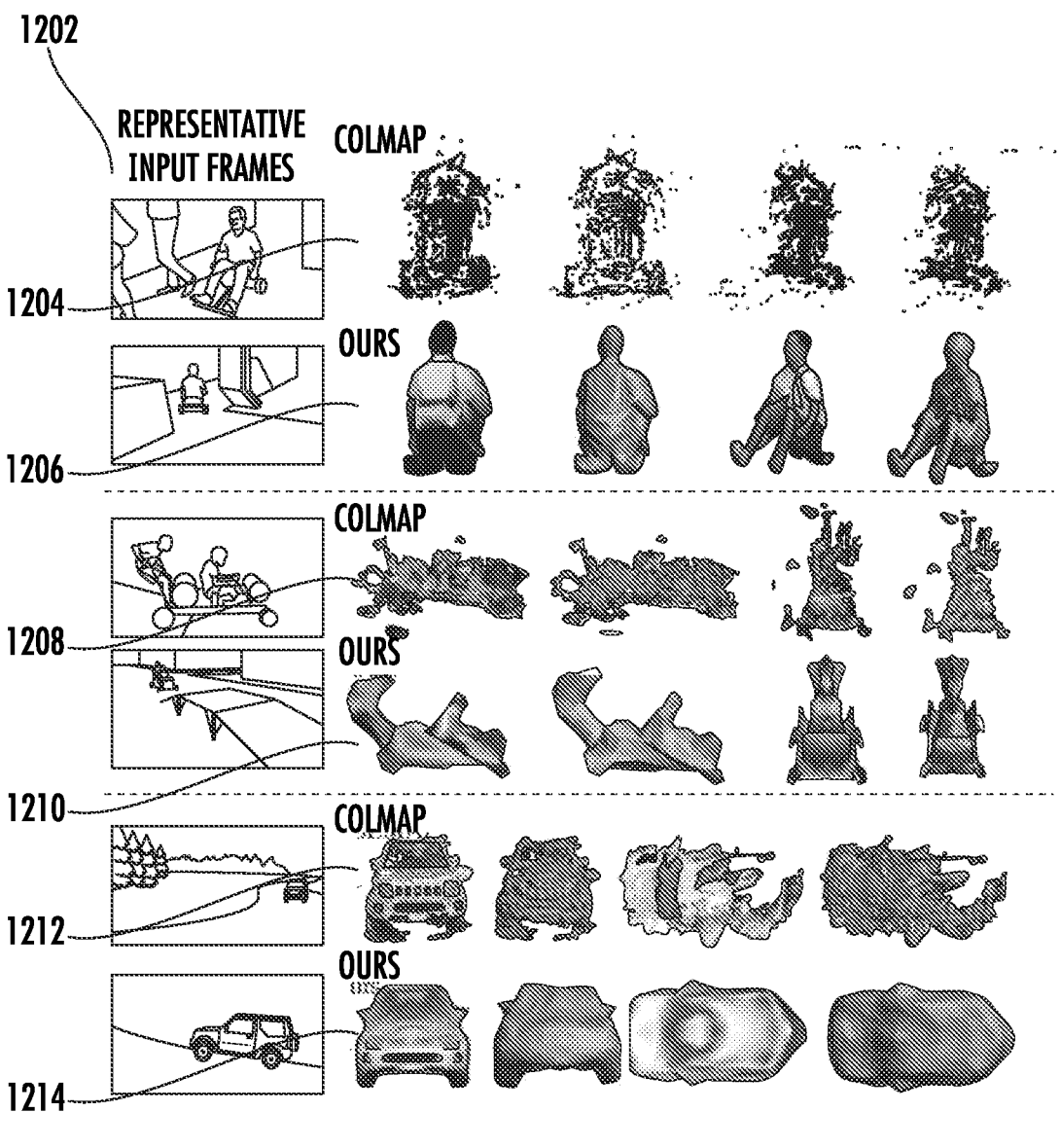
FIG. 9 illustrates a visual comparison on reconstruction of near-rigid video sequences between the COLMAP and LASR methods.

To examine the performance on arbitrary real-world objects, five videos, including dance-twirl, scooter-board, soapbox, car-turn, mallard-fly, and a cat video. The videos were segmented. The comparison with COLMAP, a template-free SfM-MVS pipeline, is illustrated in FIG. 9. Representative input frames are illustrated to the left 1202. FIG. 9 illustrates the results of COLMAP using the scooter-board video 1204. FIG. 9 illustrates the results of LASR using the scooter-board video 1206. FIG. 9 illustrates the results of COLMAP using the soapbox video 1208. FIG. 9 illustrates the results of LASR using the soapbox video 1210. FIG. 9 illustrates the results of COLMAP using the car-turn video 1212. FIG. 9 illustrates the results of LASR using the car-turn video 1214. The comparisons are done between near-rigid sequences. COLMAP reconstructs only the visible rigid part, while LASR reconstructed both the rigid object and near-rigid person.

Figure 10:
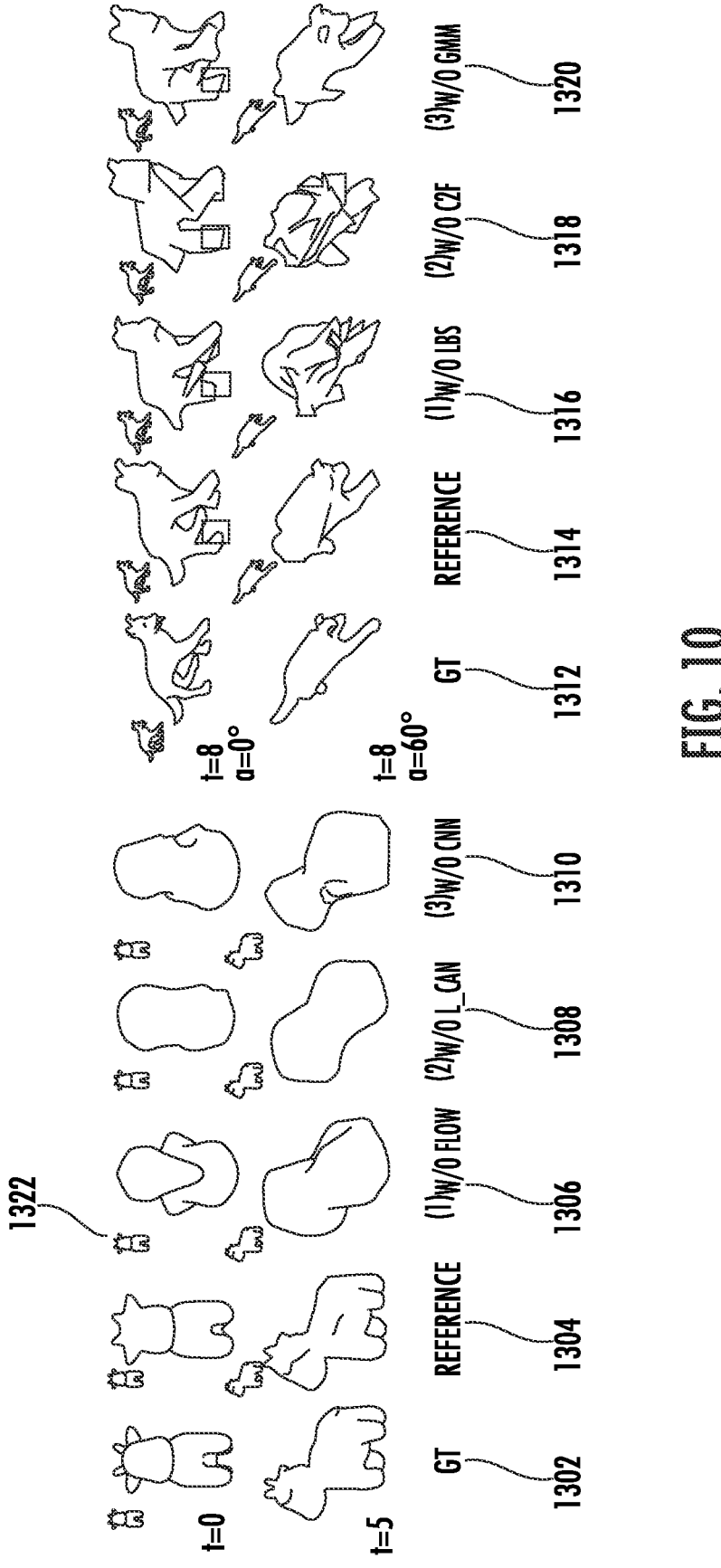
FIG. 10 illustrates examples of an ablation study result on camera and rigid shape optimization using various methods as well as articulated shape optimization using various methods.

The effect of different design choices on the rigid cow and animated dog sequences were investigated. The videos were rendered using an ambient light and a camera rotating around the object horizontally (a full circle for the cow and ¼ circle for the dog) in T=15 frames. Besides color images, the silhouette and optical flow as the supervision were rendered. Results are illustrated in FIG. 10. FIG. 10 illustrates the renderings of the silhouette and optical flow as the supervision using GT at t=0 and t=5 for the cow 1302. FIG. 10 illustrates the renderings of the silhouette and optical flow as the supervision using the reference at t=0 and t=5 for the cow 1304. FIG. 10 illustrates the renderings of the silhouette and optical flow as the supervision using GT at t=0 and t=5 for the cow 1304. FIG. 10 illustrates the renderings of the silhouette and optical flow as the supervision without flow at t=0 and t=5 for the cow with optical flow as supervision signals 1306. FIG. 10 illustrates the renderings of the silhouette and optical flow as the supervision without L can at t=0 and t=5 for the cow with canonicalization of symmetry plane 1308. FIG. 10 illustrates the renderings of the silhouette and optical flow as the supervision without convolutional neural network (CNN) at t=0 and t=5 for the cow with CNN as an implicit representation for camera parameters 1310. FIG. 10 illustrates the renderings of the silhouette and optical flow as the supervision using GT at t=8 and $\alpha=0°$ and $\alpha=60°$ for the dog 1312. FIG. 10 illustrates the renderings of the silhouette and optical flow as the supervision using the reference at t=8 and $\alpha=0°$ and $\alpha=60°$ for the dog 1314. FIG. 10 illustrates the renderings of the silhouette and optical flow as the supervision without LBS at t=8 and $\alpha=0°$ and $\alpha=60°$ for the dog with linear blend skinning 1316. FIG. 10 illustrates the renderings of the silhouette and optical flow as the supervision without C2F at t=8 and $\alpha=0°$ and $\alpha=60°$ for the dog with coarse-to-fine re-meshing 1318. FIG. 10 illustrates the renderings of the silhouette and optical flow as the supervision without Gaussian Mixture Model (GMM) at t=8 and $\alpha=0°$ and $\alpha=60°$ for the dog with a parametric skinning model 1312. 1302, 1304, 1306, 1308, and 1310 illustrate an ablation study on camera and rigid shape optimization. Removing the optical flow loss introduces large errors in camera pose estimation and therefore the overall geometry is not recovered. Removing the canonicalization loss leads to worse camera pose estimation, and therefore the symmetric shape constraint is not correctly enforced. Finally, if the camera poses are directly optimized without using a convolutional network, it converges much slower and does not yield an ideal shape within the same iterations. 1312, 1314, 1316, 1318, 1320 illustrate an ablation study on articulated shape optimization. In particular, the reconstructed articulated shape at the middle frame (t=8) from two viewpoints is illustrated. Without LBS model, although the reconstruction looks plausible from the visible view, it does not recover the full geometry due to the redundant deformation parameters and lack of constraints. Without coarse-to-fine re-meshing, fine-grained details are not recovered. Replacing GMM skinning weights (9xB parameters) with a NxB matrix leads to extra limbs and tails on the reconstruction.

Quantitative results are reported in Table 4 below. In terms of camera parameter optimization and rigid shape reconstruction (S0), [1] refers to optical flow as supervision signals, [2] refers to canonicalization of symmetry plane, and $^{(3)}$ refers to CNN as an implicit representation for camera parameters. For articulated shape reconstruction (S1-S3), $^{(1)}$ refers to linear blend skinning, $^{(2)}$ refers to coarse-to-fine re-meshing, and $^{(3)}$ refers to parametric skinning model.

TABLE 4

| Ablation study with mesh reconstruction error. | | | | |
|---|---|---|---|---|
| S0 | ref. | $^{(1)}$w/o flow | $^{(2)}$w/o L$_{can}$ | $^{(3)}$w/o CNN |
| spot | 0.03 | 0.55 | 0.61 | 0.63 |
| S0-S3 | ref. | $^{(1)}$w/o LBS | $^{(2)}$w/o C2F | $^{(3)}$w/o GMM |
| dog | 0.28 | 0.68 | 0.59 | 0.34 |

Example Methods

FIG. 11 depicts a flow chart diagram of an example method to perform according to example embodiments of the present disclosure. Although FIG. 11 depicts steps performed in a particular order for purposes of illustration and discussion, the methods of the present disclosure are not limited to the particularly illustrated order or arrangement. The various steps of the method 1400 can be omitted, rearranged, combined, and/or adapted in various ways without deviating from the scope of the present disclosure.

At 1402, a computing system can obtain an input image that depicts an object and a current mesh model of the object. The input image can be one or more images. Furthermore, the input image may be a plurality of images attached together in the form of a video. The video may be a monocular video. The object depicted in the input image can be an object of interest. Furthermore, the object can be any entity of interest such as an animal, human, or inanimate object.

At 1404, the computing system can process the input image with a machine-learned camera model to obtain camera parameters and object deformation data for the input image. The camera parameters can describe a camera pose for the input image. The object deformation data describes one or more deformations of the current mesh model relative to a shape of the object shown in the image. The input image can further be processed to obtain rest shape, skinning weights, and articulation.

At 1406, the computing system differentiably renders a rendered image of the object based at least in part on the camera parameters. The computing system can additionally differentiably render a rendered image of the object based at least in part on the object deformation data. The computing system can additionally differentiably render a rendered image of the object based at least in part on the current mesh model. Differentiably rendering a rendered image of the object can include articulating the rest shape under linear blend skinning. The computing system can articulate the rest shape under linear blend skinning given predicted articulation parameters and skinning weights.

At 1408, the computing system can evaluate a loss function that compares one or more characteristics of the input image of the object with one or more characteristics of the rendered image of the object. The one or more characteristics of the rendered image of the object that can be compared to the one or more characteristics of the input image of the object can include pixels, optical flow, and segmentation.

At 1410, the computing system can modify one or more values of one or both of the machine-learned camera model and the current mesh model based on a gradient of the loss function. The one or more values of one or both of the machine-learned camera model and the current mesh model can include camera, shape or articulation parameters.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for determining 3D object shape from imagery, the method comprising:

obtaining, by a computing system comprising one or more computing devices, an input image that depicts an object and a current mesh model of the object, wherein the current mesh model of the object comprises a plurality of vertices, a plurality of joints, and a plurality of blend skinning weights for the plurality of joints relative to the plurality of vertices;

processing, by the computing system, the input image with a camera model to obtain camera parameters, articulation parameters, and object deformation data for the input image, wherein the camera parameters describe a camera pose for the input image, wherein the articulation parameters are based on the plurality of vertices, the plurality of joints, and the plurality of blend skinning weights, wherein the object deformation data describes one or more deformations of the current mesh model relative to a shape of the object shown in the input image, and wherein the processing comprises linear blend skinning based on the articulation parameters;

differentiably rendering, by the computing system, a rendered image of the object based on the camera parameters, the articulation parameters, the object deformation data, and the current mesh model;

evaluating, by the computing system, a loss function that compares one or more characteristics of the input image of the object with one or more characteristics of the rendered image of the object; and modifying, by the computing system, one or more values of one or both of the camera model and the current mesh model based on a gradient of the loss function.

2. The computer-implemented method of claim 1, wherein evaluating the loss function comprises:

determining a first flow for the input image;

determining a second flow for the rendered image; and evaluating the loss function based at least in part on a comparison of the first flow and the second flow.

3. The computer-implemented method of claim 1, wherein evaluating the loss function comprises:

determining a first silhouette for the input image;

determining a second silhouette for the rendered image; and evaluating the loss function based at least in part on a comparison of the first silhouette and the second silhouette.

4. The computer-implemented method of claim 1, wherein evaluating the loss function comprises evaluating the loss function based at least in part on a comparison of first texture data associated with the input image and second texture data associated with the rendered image.

5. The computer-implemented method of claim 1, wherein the mesh model comprises a triangular mesh model.

6. The computer-implemented method of claim 1, wherein the camera parameters describes an object-to-camera transformation for the input image.

7. The computer-implemented method of claim 1, wherein the camera model comprises a convolutional neural network.

8. The computer-implemented method of claim 1, wherein the camera parameters further describe a focal length for the input image.

9. The computer-implemented method of claim 1, wherein the mesh model is initialized to a subdivided icosahedron projected to a sphere.

10. The computer-implemented method of claim 1, wherein one or both of the camera model and the current mesh model comprise both the camera model and the current mesh model.

11. The computer-implemented method of claim 1, wherein the plurality of joints and the plurality of blend skinning weights are learnable.

12. The computer-implemented method of claim 1, wherein differentiably rendering the rendered image of the object based on the camera parameters, the object deformation data, and the current mesh model comprises rendering the current mesh model deformed according to the object deformation data and from the camera pose according to the camera parameters.

13. The computer-implemented method of claim 1, further comprising performing the method of claim 1 on multiple images that depict multiple objects to build a library of shape models from the multiple images.

14. The computer-implemented method of claim 1, wherein obtaining the input image that depicts the object comprises manually choosing a canonical image frame from a video.

15. The computer-implemented method of claim 1, wherein obtaining the input image that depicts the object comprises:

selecting a number of candidate frames;

evaluating a loss for each of the candidate frames; and selecting the candidate frame with a lowest final loss as a canonical frame.

16. A computer system, comprising:

one or more processors; and one or more non-transitory computer-readable media that collectively store:

a machine-learned mesh model for an object, wherein the machine-learned mesh model for the object comprises a plurality of vertices, a plurality of joints, and a plurality of blend skinning weights for the plurality of joints relative to the plurality of vertices, wherein the machine-learned mesh model for the object has been learned jointly with a machine-learned camera model by minimizing a loss function that evaluates a difference between one or more input images of the object and one or more rendered images of the object, the one or more rendered images comprising images rendered based on the machine-learned mesh model, camera parameters, and linear blend skimming based on articulation parameters, wherein the articulation parameters and the camera parameters are generated by the machine-learned camera model from the one or more input images, and wherein the articulation parameters are based on the plurality of vertices, the plurality of joints, and the plurality of blend skinning weights; and instructions that, when executed by the one or more processors, cause the computing system to perform operations, the operations, comprising:

receiving an additional set of camera parameters; and rendering an additional rendered image of the object based on the machine-learned mesh model and the additional set of camera parameters.

17. The computing system of claim 16, wherein the loss function compares a first flow for each input image with a second flow for each rendered image.

18. The computing system of claim 16, wherein the loss function compares a first silhouette for each input image with a second silhouette for each rendered image.

19. The computing system of claim 16, wherein the loss function compares a first texture for each input image with a second texture for each rendered image.

20. One or more non-transitory computer-readable media that collectively store instructions that, when executed by a computing system comprising one or more computing devices, cause the computing to perform operations, the operations comprising:

obtaining, by the computing system, an input image that depicts an object and a current mesh model of the object, wherein the current mesh model comprises a plurality of vertices, a plurality of joints, and a plurality of blend skinning weights for the plurality of joints relative to the plurality of vertices;

processing, by the computing system, the input image with a camera model to obtain camera parameters, articulation parameters, and object deformation data for the input image, wherein the camera parameters describe a camera pose for the input image, wherein the articulation parameters are based on the plurality of vertices, the plurality of joints, and the plurality of blend skinning weights, wherein the object deformation data describes one or more deformations of the current mesh model relative to a shape of the object shown in the image, and wherein the processing comprises linear blend skinning based on the articulation parameters;

differentiably rendering, by the computing system, a rendered image of the object based on the camera parameters, the articulation parameters, the object deformation data, and the current mesh model;

evaluating, by the computing system, a loss function that compares one or more characteristics of the input image of the object with one or more characteristics of the rendered image of the object; and modifying, by the computing system, one or more values of one or both of the camera model and the current mesh model based on a gradient of the loss function.

\* \* \* \* \*